United States Patent
Srinivasan et al.

(10) Patent No.: US 6,357,042 B2
(45) Date of Patent: Mar. 12, 2002

(54) METHOD AND APPARATUS FOR MULTIPLEXING SEPARATELY-AUTHORED METADATA FOR INSERTION INTO A VIDEO DATA STREAM

(76) Inventors: Anand Srinivasan, 12718 Torrey Bluff Dr. #155; Mehul Y Shah; Indranil Chakraborty, both of 12633 El Camino Real #3408; Mohan Mardikar, 12640 Torrey Bluff Dr. #7; P Venkat Rangan, 13011 Callcott Way; Kamal Bhadada, 12782 Torrey Bluff Dr. #103, all of San Diego, CA (US) 92130

(*) Notice: Subject to any disclaimer, the term of this patent is extended or adjusted under 35 U.S.C. 154(b) by 0 days.

(21) Appl. No.: 09/235,781

(22) Filed: Jan. 22, 1999

Related U.S. Application Data

(63) Continuation-in-part of application No. 09/225,250, filed on Jan. 4, 1999, which is a continuation-in-part of application No. 09/218,738, filed on Dec. 22, 1998, which is a continuation-in-part of application No. 09/168,315, filed on Oct. 7, 1998, which is a continuation-in-part of application No. 09/160,365, filed on Sep. 24, 1998, which is a continuation-in-part of application No. 09/154,532, filed on Sep. 16, 1998.

(51) Int. Cl.[7] .......................... H04N 7/025; H04N 7/10; H04N 7/173; G06F 3/00; G06F 13/00
(52) U.S. Cl. .......................... 725/32; 725/119; 345/328
(58) Field of Search .......................... 709/217; 345/327, 345/328; 348/12, 13, 10, 6, 7; 455/6.1, 6.2, 6.3, 3.1, 3.2; 370/503–519; 725/119, 143, 32, 36; G06F 15/167; H04N 1/00, 1/17, 7/025, 7/11

(56) References Cited

U.S. PATENT DOCUMENTS

| | | | | |
|---|---|---|---|---|
| 5,424,770 A | * | 6/1995 | Schmelzer et al. | 348/9 |
| 5,793,980 A | * | 8/1998 | Glaser et al. | 709/231 |
| 5,889,950 A | * | 3/1999 | Kuzma | 348/6 |
| 5,894,328 A | * | 4/1999 | Tahara et al. | 348/423 |
| 5,917,830 A | * | 6/1999 | Chen et al. | 455/6.3 |
| 6,002,393 A | * | 12/1999 | Hite et al. | 345/327 |
| 6,018,768 A | * | 1/2000 | Ullman et al. | 348/12 |
| 6,034,746 A | * | 3/2000 | Desai et al. | 348/423 |
| 6,035,332 A | * | 3/2000 | Ingrassia, Jr. et al. | 709/218 |

* cited by examiner

*Primary Examiner*—Andrew Faile
*Assistant Examiner*—Vivek Srivastava
(74) *Attorney, Agent, or Firm*—Donald R. Boys; Central Coast Patent Agency, Inc.

(57) ABSTRACT

An authoring system for interactive video has two or more authoring stations for providing authored metadata to be related to a main video data stream and a multiplexer for relating authored metadata from the authoring sources to the main video data stream. The authoring stations annotate created metadata with presentation time stamps (PTS) from the main video stream, and the multiplexer relates the metadata to the main video stream by the PTS signatures. In analog streams PTS may be created and integrated. In some embodiments there may be multiple and cascaded systems, and some sources may be stored sources. Various methods are disclosed for monitoring and compensating time differences among sources to ensure time coordination in end product. In different embodiments transport of metadata to an end user station is provided by Internet streaming, VBI insertion or by Internet downloading. User equipment is enhanced with hardware and software to coordinate and present authored material with the main data stream.

21 Claims, 18 Drawing Sheets

METHOD AND APPARATUS FOR MULTIPLEXING SEPARATELY-AUTHORED METADATA FOR INSERTION INTO A VIDEO DATA STREAM

CROSS-REFERENCE TO RELATED DOCUMENTS

The present invention is a continuation-in-part (CIP) of copending patent application Ser. No. 09/225,250, filed Jan. 4, 1999 which is a CIP of Ser. No. 09/218,738, filed Dec. 22, 1998, which is a CIP of Ser. No. 09/168,315, filed Oct. 7, 1998, which is a CIP of copending application Ser. No. 09/160,365, filed Sep. 24, 1998 which is a CIP of Ser. No. 09/154,532, filed Sep. 16, 1998.

FIELD OF THE INVENTION

The present invention is in the field of video broadcasting, and pertains more particularly to methods and apparatus for multiplexing separately-authored metadata for coordination with a main video data stream.

BACKGROUND OF THE INVENTION

With continuing development of new and better ways of delivering television and other video presentations to end users, and parallel development of computerized information systems, such as the Internet and the associated World Wide Web (WWW), there have been concerted efforts to integrate various systems to provide enhanced information delivery and entertainment systems. For example, developers are introducing integrated systems combining TVs with computer subsystems, so a TV may be used as a WEB browser, or a PC may be used for enhanced TV viewing.

In some systems computer elements, such as a CPU, memory, and the like, are built into the familiar chassis of a TV set. In such a system, the TV screen becomes the display monitor in the computer mode. In such a system, conventional TV elements and circuitry are incorporated along with the computer elements, and capability is provided for a user to switch modes, or to view recorded or broadcast video with added computer interaction. One may thus, with a properly equipped system, select to view analog TV programs, digital TV programs, conventional cable TV, satellite TV, pay TV from various sources, and browse the WWW as well, displaying WEB pages and interacting with on-screen fields and relational systems for jumping to related information, databases, and other WEB pages. The capabilities are often integrated into a single display, that is, one may view a broadcast presentation and also have a window on the display for WEB interaction.

In some other systems, computer elements are provided in an enclosure separate from the TV, often referred to in the art as a set-top box. Set-top box systems have an advantage for providers in that they may be connected to conventional television sets, so end users don't have to buy a new TV along with the computer elements.

In such integrated systems, whether in a single enclosure or as set-top box systems, user input is typically through a hand-held device quite similar to a familiar remote controller, usually having infra-red communication with the set-top box or a receiver in the integrated TV. For computer modes, such as WEB browsing, a cursor is displayed on the TV screen, and cursor manipulation is provided by buttons or other familiar pointer apparatus on the remote. Select buttons are also provided in the remote to perform the familiar function of such buttons on a pointer device, like a mouse or trackball more familiar to computer users.

Set-top boxes and computer-integrated TVs adapted as described above typically have inputs for such as a TV antenna (analog), cable TV (analog or digital), more recently direct-satellite TV (digital), and may also connect to video cassette recorders and to mass storage devices such as hard disk drives and CD-ROM drives to provide a capability for uploading video data from such devices and presenting the dynamic result as a display on the TV screen.

The present inventors have noted that with the coupling of computer technology with TV, many capabilities familiar to computer users have been made available to TV users. For example, ability to provide text annotation for TV presentations is considerably enhanced. Computer techniques such a Pix-on-Pix are now available, wherein separate TV presentations may be made in separate windows, or overlaid windows on the display screen. Separate windows may also support display from separate sources, such as an analog TV program in one window, a computer game in another, and a video conference in a third.

With the technologies described above becoming more available in the market place, it has become desirable to further integrate the technologies described so that a user viewing a video presentation might be enabled to gather additional information about a specific image entity or entities portrayed in a video through interactive method. An ultimate goal is to provide a means for advertisers to promote and sell products through user interaction in a way that minimizes steps required by such a user to access additional information regarding traditionally advertised products such as through commercials and the like.

In typical prior art video authoring systems, end users receive a single video stream that contains the video data and any added annotated data such as subtitling, sponsor logos, information blocks, and the like. However, it is desirable to build upon the goal stated in the preceding paragraph above, by having separate streams, one containing video data, and the other containing annotative data, that may arrive at and end user's location via different delivery media and be displayed synchronously on a suitable display screen.

An authoring system, known to the inventor, may provide image tracking coordinates along with various further annotation, and may deliver separate streams via separate carriers to an end user. Also known to the inventor is a system for providing a means of applying a signature and associative frame identification to the separate streams respectively before broadcast so that both streams may later be re-synchronized at the user's end. Such a system is likewise described under the cross-referencing section.

In current art commercial programming, various companies may purchase advertising blocks or time slots from a content provider. The content provider then edits-in such commercials to the appropriate slots before broadcasting. Typically, such commercial ads may be local to an area of broadcast and are limited in profiling to those general demographics associated with a range or geography of local viewers. For example, in a broadcast football game, commercials may be geared to appealing to a general profile of a sports fan. For a cable channel carrying exclusively women's programming, advertisements would be geared more toward women in general. The profiling or focusing of advertisement a company can do is thus quite limited.

A system known to the inventors and disclosed in this patent application under the sub-heading below titled "Personalized and Interactive Ad System/Network" provides in one embodiment an Internet-connected subscription server running an ad-engine in the form of a software application that has ability to select video ads according to user profile and to stream such ads to a user along with a main video data stream. In some cases the ads are interactive. In systems wherein the main video and such video ads are sent by a common carrier, such as an Internet connection, the ads are inserted in the main video stream in the form of video metadata.

It is desirable that that more than one authoring station or system may be used when creating metadata for delivery to an end user, because there are a variety of functions that may be implemented through metadata. For example, it is desirable that separate authoring stations will be used in hyper-video authoring, such as in providing object tracking coordinates, creating hot spots (hyperlinks) in a video, providing interactive regions for tracked objects, inserting URL's, providing review markers by scene authoring, and so on. Scene authoring based on scene-change-detection-technology (SCDT) has several purposes, such as providing thumbnails as bookmarks for users to select and review particular portions of video presentations, and for markers for ad insertion or insertion of other information. In addition, separate ad information may be authored by yet additional authors and provided as metadata for delivery to an end user.

While combination of live video and live annotation streams is treated herein concerning hyper-video authoring and delivery, it is generally understood that in the live case, annotation streams may be timed to run in sync alongside or over a main video steam. This process is performed at the provider's end. However, the presence of possibly two or more separately-authored annotation data-sets wherein the method of delivery is not necessarily in real time, requires a more comprehensive approach.

What is clearly needed is a method and apparatus for merging separately-authored sets of metadata such that the metadata is associated appropriately to a correct frame location in a main video. Such a method and apparatus would serve to ad flexibility to the authoring process and to simplify delivery methods.

SUMMARY OF THE INVENTION

In a preferred embodiment of the present invention an authoring system for interactive video, comprising a video feed providing a main video presentation stream; two or more authoring stations coupled to the video feed providing authoring functions creating metadata for enhancing the main video stream; and a multiplexer for coordinating authored metadata with the main video stream. The authoring stations may note a presentation time stamp (PTS) of video frames or any other time stamp and incorporate it in the authored metadata for matching the metadata with the main video presentation stream.

In various embodiments there is a multiplexer for combining authored metadata with the main video data stream, and the multiplexer places the metadata in relation to the main video data stream according to the PTS. The multiplexer in some cases receives multiple video streams as well as the authored metadata, and time clocks are monitored for separate stream sources and clocks are adjusted to compensate for real-time differences in sources. One or more of the stream sources may be from a stored source. In some embodiments PTS values are rewritten in one or more streams to compensate for perceived time differences. Also in some embodiments PTS-enhanced metadata is streamed over the Internet to an end user, and in others the PTS-enhanced metadata is inserted into video blanking intervals (VBI) of an analog stream according to the PTS. In still other embodiments the PTS-enhanced metadata is stored to be downloaded as needed by a user.

In various embodiments of the invention the authoring stations may include one or more of scene authoring, hyper-video authoring, and ad authoring stations. At the user end the user system is enhanced with software for displaying the main video data stream and the authored metadata according to the PTS.

In another aspect of the invention a method for coordinating authored video metadata with a main video data stream is provided, comprising steps of (a) ensuring the main video data stream has a presentation time stamp (PTS); (b) feeding the digital main video data stream to authoring stations; (c) authoring matadata at the authoring stations; and (d) marking the metadata with presentation time stamps (PTS) from the main video data stream.

This method may further comprise a step for multiplexing authored metadata with the main video data stream, wherein the multiplexer places the metadata in relation to the main video data stream according to the PTS. There may also be multiple sources of video fed to the multiplexer as well as multiple metadata streams for a video, and a step as well for compensating for real-time differences between the multiple sources. In the compensating step, presentation time stamps (PTS) may be amended according to source time differences.

In some cases the PTS-enhanced metadata is streamed over the Internet to an end user. In other cases the PTS-enhanced metadata is inserted into video blanking intervals (VBI) of an analog stream according to the PTS. In still other cases the PTS-enhanced metadata is stored to be downloaded as needed by a user. The authoring stations may include one or more of scene authoring, hyper-video authoring, and ad authoring stations, and analog streams may be accommodated in some embodiments by conversion to a digital format before authoring and multiplexing, and in others by integrating a PTS with the analog stream. Also, at the final user's end, there is software for rendering the main video data stream and authored metadata according to PTS.

In yet another aspect of the invention a digital video multiplexing system is provided comprising metadata inputs from video authoring stations; an input for a main digital video data stream; and an output to a video transport interface. The multiplexer notes presentation time stamps associated with authored metadata, and places the authored metadata relative to the main video data stream for transport to end users. The multiplexing system may have multiple video data stream inputs, and one or more of the inputs may be from a stored source. There may also be multiple video data stream inputs from multiple sources, and the multiplexer monitors real time clocks of the sources and uses the information to compensate one or both of the multiple streams. In case of real-time differences the multiplexer compensates incoming streams by buffering one or more of the streams. The multiplexer may also compensate incoming streams by amending the presentation time stamps of one or more of the streams.

In embodiments of the invention as taught in enabling detail below, for the first time it is possible to annotate one or more main video streams, either analog or digital streams, and to enhance the streams with authored metadata in a manner that multiple inputs may be made and fully coordinated to be completely useful when finally delivered to the end user, and many interactive functions not previously known in the art are provided.

BRIEF DESCRIPTION OF THE DRAWING FIGURES

DESCRIPTION OF THE PREFERRED EMBODIMENTS

According to a preferred embodiment of the present invention, a method and apparatus is provided which allows a programmer functioning in a video editing mode to initiate tracking of any image entity or entities in a video stream, after which initiation tracking may be automatic, wherein appropriate coordinate-tracking data associated with the image entity or entities is provided synchronized with the original data stream so that such entities may later be rendered identifiable and interaction-capable to an end user. By image entity is meant any person or thing depicted in a video display, such as a player in a sports game, and actor in a play, a car in a car race, and so on.

Figure 1:
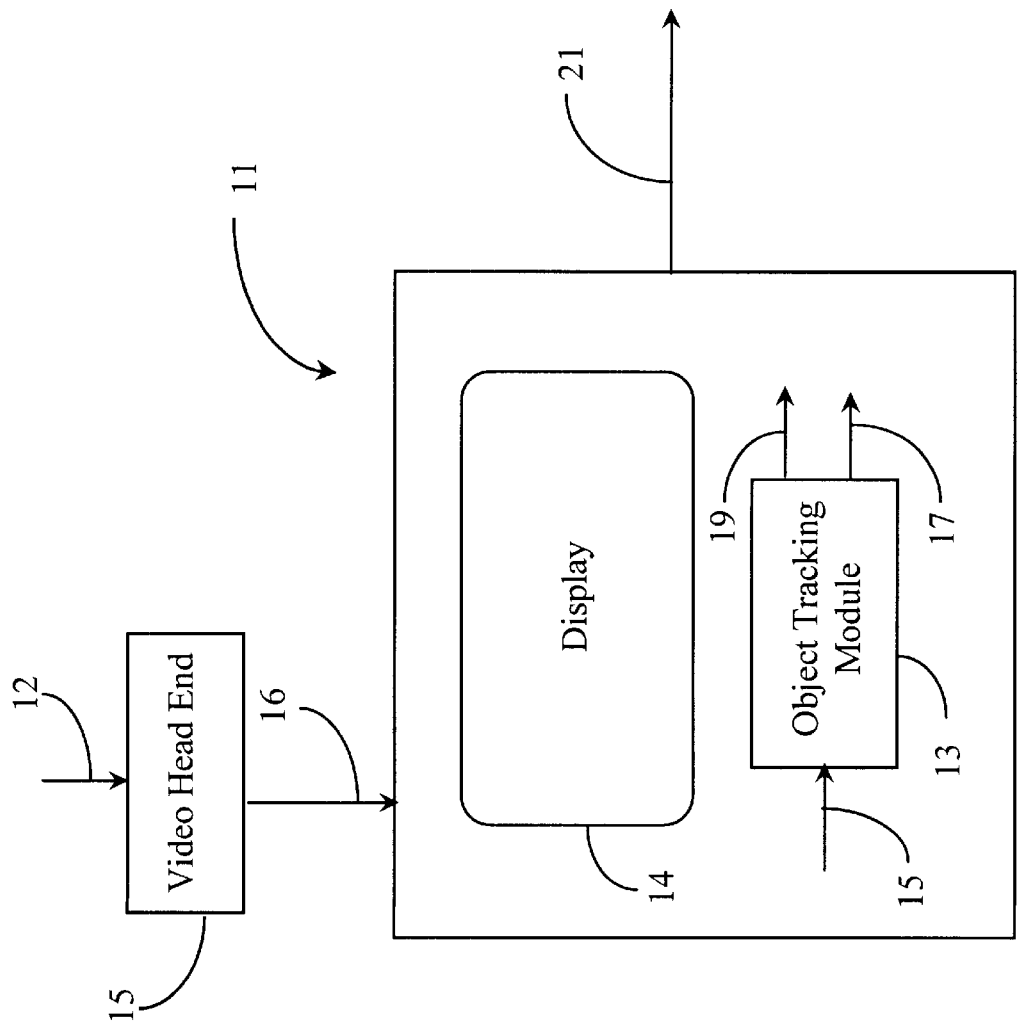
FIG. 1 is a block diagram illustrating an authoring system incorporating an image tracking module according to an embodiment of the present invention.

FIG. 1 is a block diagram illustrating an authoring station 11 adapted for accepting a video data stream 16 from a video head end 15 as is known in the art. The original video data source 12 may be any recorded or live source and is not limited as to protocol. Authoring station 11 includes a display 14 and an object tracking module 13 which is adapted to automatically track image entities in a video presentation, and to synchronize the tracking result with the video data stream.

The overall purpose of the authoring station is addition of innovative material to the video data stream, such as text overlay, graphic icons and logos for advertisement, some of which may be associated with identity and address data to allow a viewer at a computerized end station to access advertisements and other data which may be associated with individual entities in the video presentation. Advertisements may, for example, be associated with a tracked object. Also the text annotations could either be set to track along with an object, or appear in a fixed position anywhere on the screen, as they are typical in broadcasts today.

In FIG. 1 input data stream 15 to tracking module 13 is a stream of successive bitmapped frames in a normalized resolution, required by the tracking module. The authoring station can be based on virtually any sort of computer platform and operating system, and in a preferred embodiment, a PC station running MS Windows is used, in which case the input stream 16, regardless of protocol, is converted to bitmapped frames displayed typically at 30 frames per second with a resolution of 352 by 240 pixels.

The use and operation of the tracking module is disclosed below in enabling detail, and outputs both the original data stream 19 and an annotation stream, which in this case comprises the data of one or more tracks for moving entities in the video display. These two streams may be combined or separately provided to downstream processes and equipment, and other annotations and alterations may be made to the data stream in the authoring station, as described above. Output 21 from authoring station 11 is meant to be a general indication of data output, and not to indicate that there is a single data stream. There may be multiple streams of various protocol.

An authoring station such as station 11 comprises software that may process various media (analog or digital) including video presentations or streams, both live and recorded. For example, included video stream types including but not limited to common formats such as Audio Video Interleave (AVI) and Moving Pictures Experts Group (MPEG). Video source 12 may embody any video source that may be known in the art such as a CD-ROM, Satellite TV, cable TV, VCR, Internet Server, and so on. Video source 12 may provide prerecorded video or live broadcast video. Also, future new formats of video streams shall be considered equivalent in the sense of this invention.

As described briefly above, the inventor has found that a suitable computer platform for performing the tracking process enabled by tracking module 13 is a PC/VDU running Windows with a central processing unit (CPU) operating at at least 300 megahertz and having at least 64 megabytes of random access memory (RAM). Video frequency or a frame speed of 30 frames per second (FPS) is utilized in this example as a suitable and compatible standard for processing. The display size of the video picture in this instance is 352×240 pixels, which is a reduced resolution from that normally displayed in a video presentation on most end use stations, but provides a suitable format for the present tracking process. It will, however, be apparent to the skilled artisan that the example parameters presented herein are not limiting to the success of practicing the present invention. Other video frame speeds, video display sizes, computer platform types and speeds, and software types may be employed in other embodiments of the present invention. The only requirement is that the processor be powerful enough to enable the tracking process at the necessary frame speed.

Tracking module 13 is a software module provided as a component of a Windows driver in this particular embodiment. In other embodiments, module 13 may be provided as a driver or as a component of a driver for another platform such as may be used as an alternative to Windows™. Module 13 interfaces with other software components executing on station 11 for the purpose of adding the functionality of the present invention which is the ability to track a moving image entity within a presented video stream.

Tracking module 13 is adapted to determine a pixel signature associated with a visual entity to be tracked in a video display, and then to determine the path of the pixel signature in the display as the path of the image entity to be tracked.

Once the video stream is in the domain of tracking module 13, an image entity in a fist bitmap image is selected to be tracked, and further frame-by-frame movement of the image entity is automatically tracked. Tracking data associated with a tracked image entity is associated with the bitmap video stream via a second synchronous data-stream comprising the frame-by-frame coordinates of the tracked image entity. This output video stream comprises the original stream plus the synchronous data stream that contains the tracking data and is illustrated (via directional arrow) as leaving module.

The end result of tracking process of the present invention is a series of coordinates of an assumed center point of a tracking object associated with the image entity selected to be tracked. Through additional editing processes a moving region associated with the image entity in a display may be made to be interactive and identifiable to an end user. User interaction with such an image entity during viewing of a video can be programmed to provide additional network-stored information about that entity to suitable customer premises equipment (CPE) adapted to receive and display the information. Such further information may be displayed, for example, as an overlay on the display of the dynamic video containing the subject image entity. In this way, advertisers, product promoters, or the like may present information to end users based on user interaction with an associated entity in a dynamic video display.

Figure 2:
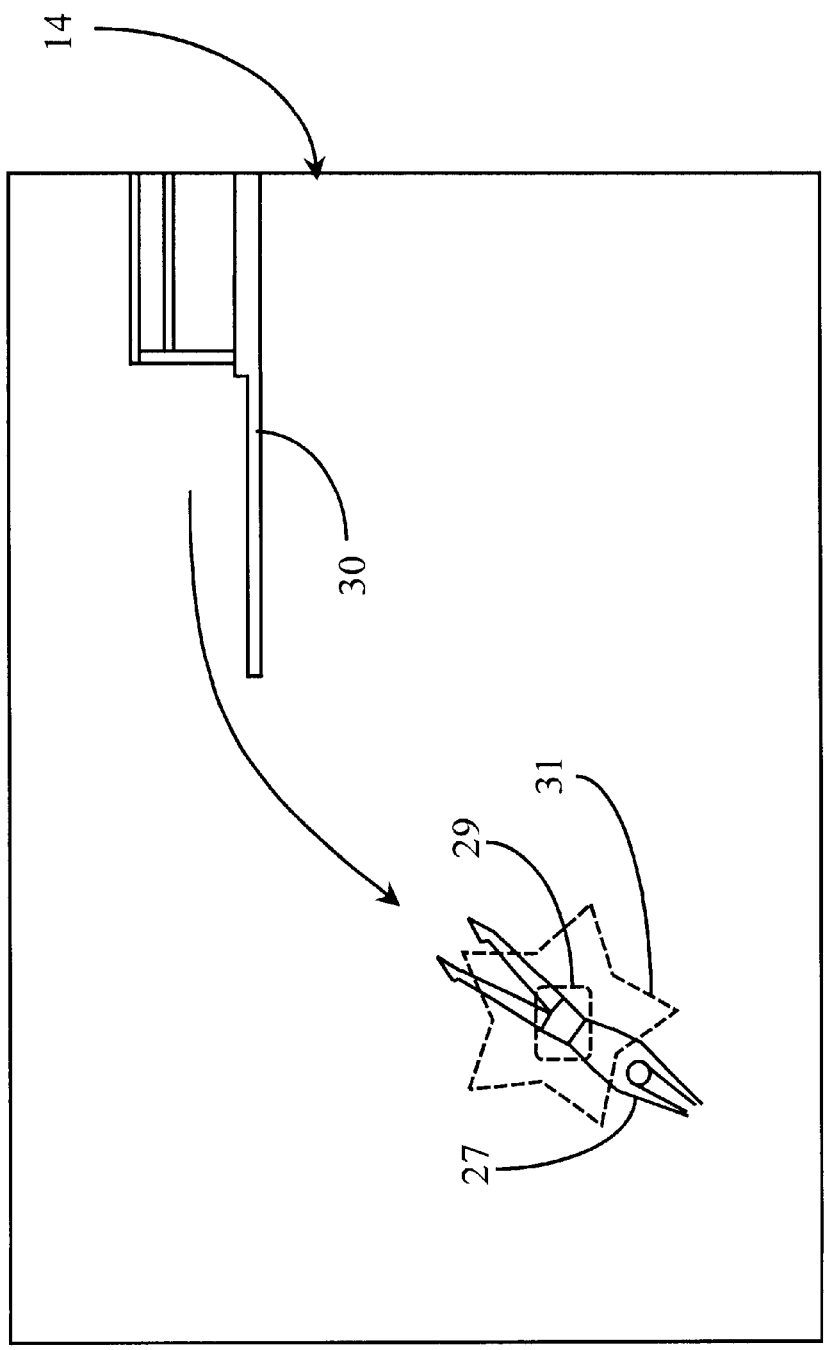
FIG. 2 is an illustration of a display screen depicting a tracked image entity according to an embodiment of the present invention.

FIG. 2 is an illustration of a display screen depicting an image entity 27 to be tracked according to an embodiment of the present invention. PC/VDU display 14 shows a bitmap image stream during the tracking process. Screen 14 is a display screen as viewed by a programmer or editor performing the tracking process.

To begin, an editor selects, typically by well-known cursor technique, a tracking box 29 of pre-selected shape and size, and places (drag-and-drop, click-on etc.) the selected box over an image entity to be tracked, with the center point of the box substantially centered on the image entity to be tracked or at least on a portion of the entity. In a preferred embodiment the editor will have a varied repertoire of sizes and shapes of tracking boxes from which to select, which may be displayed in such as a menu bar, as is well-known in the art. In this example, the editor wishes to track a diver 27 from a diving board 30 and into the water below the diving board. The image entity selected for tracking, however, is not the diver per se, but the swim suit worn by the diver, for reasons which will become more clear in the descriptions below. It is logical to assume that tracking, in this embodiment, commenced as diver 27 begins his dive.

A semi-transparent shape 31 defines an area that may be rendered an interactive area linked to the swim suit of diver 27 as might be seen by an end user watching the video. Typically, shape 31 which is in this case the shape of a star, will not be present or seen in screen 14 during the tracking process, but is illustrated here solely for the purpose of discussion, in that through later video editing processes such shapes may be added to an image stream based on the provided information (frame by frame tracking coordinates of the swim suit).

As previously described, as an initiating event, tracking box 29 is placed over an image entity to be tracked, in this case the swim suit and the tracking process is activated via a mouse click or other command action such as may be executed via keyboard input. Upon tracking box 29 being activated the tracking module creates a table or list comprising pixel values associated with a target number and spatial arrangement of pixels (not shown in FIG. 2) associated with tracking box 29. These target pixels are determined in a preferred embodiment by a random algorithm which is shaded to provide a higher density at and around the centerpoint of the tacking box. The color values for the target pixels are taken from the Video Graphics memory array of the authoring station being used to display the video stream. Specifically, the color (e.g. RGB) values of each target pixel are used as a base comparison signature for tracking box 29 during frame by frame motion (internal frame rate).

Activation of tracking box 29 invokes object tracking module 13 of FIG. 1 and it's subsequent functions. Further detail regarding the unique use of target pixels is described below.

Figure 3:
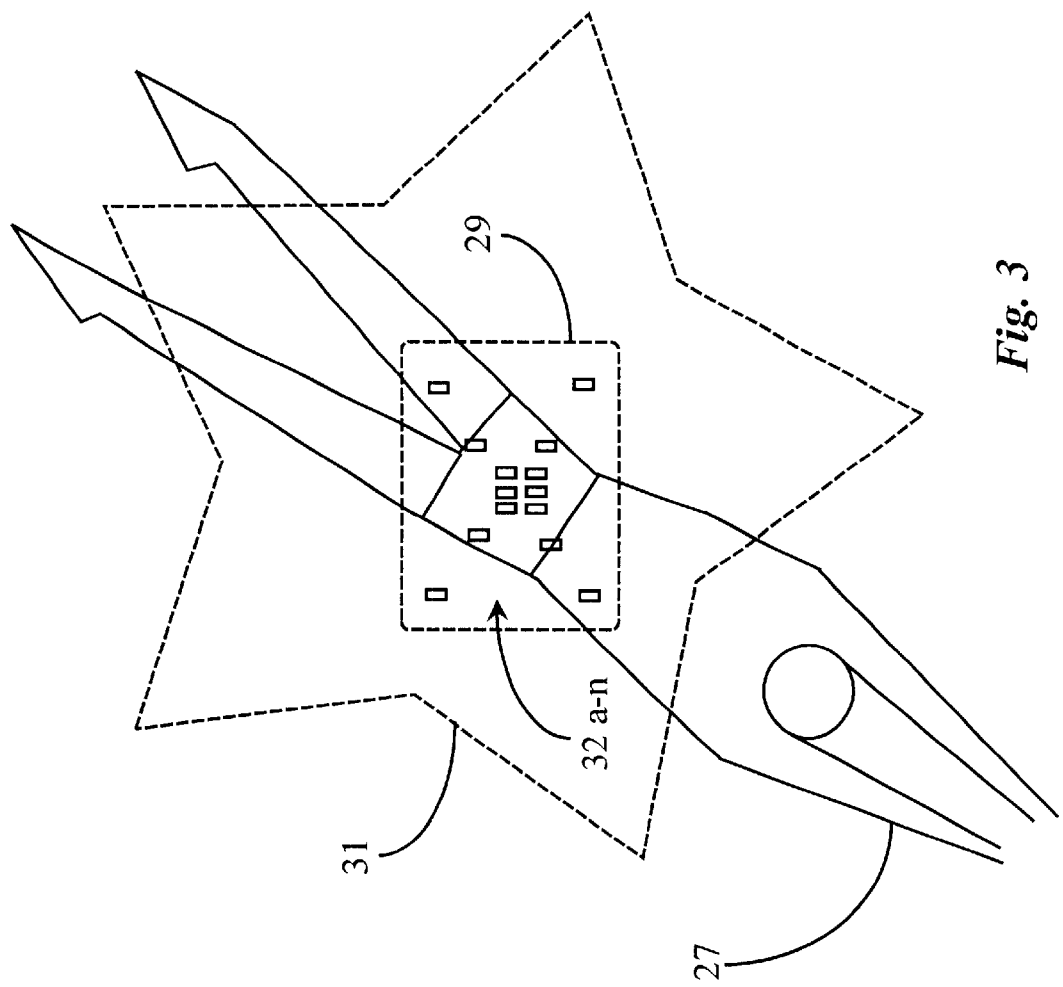
FIG. 3 is an enlarged view of the image entity of FIG. 2 wherein key pixels are visible.

FIG. 3 is an enlarged view of the image entity of FIG. 2 wherein key pixels are shown within the selected tracking box. Tracking box 29 may be any size or shape desired for fitting over an entity selected to be tracked, however a predefined number of target pixels, represented via elements 32a–n, remains substantially constant regardless of size and shape of the tracking box selected. The reason, in this embodiment, for a relatively constant number of pixels is that the process requires an iterative calculation process wherein the values for each signature pixel are involved in calculation at least once for each succeeding frame of the video while the tracking process is running. Since the computing power of the tracking stations remains constant, it is desirable to use a relatively large number of signature pixels (more definitive signature) but not to exceed the computing power of the station.

Although the number of pixels shown in FIG. 3 as signature pixels for exemplary purposes is rather small, and the spacing is indicated as rather regular, there will in reality be a rather larger number of signature pixels associated with a tracking box. In development of working models of the tracking module the number of pixels usable with a high-end PC is from 300 to one thousand. This number, of course, may vary in various embodiments of the tracking module according to the present invention. It has also been determined that a default arrangement of signature pixels with a higher density toward the center of the tracking box is desirable. With the number of pixels constant, or relatively so, from one tracking box to another, the density will vary according to the areal extent of the tracking box selected.

In a preferred embodiment, as briefly mentioned above, the spatial arrangement of the target pixels is randomly generated with a higher density toward the center of the tracking box. The randomization may occur before or after a box is selected. In some cases, an editor may select a shape and resize the box before or in the process of placing the box over an entity to be tracked. In such cases the distribution of target pixels may change as the box is resized, and so on. In other embodiments default target pixel formats may be used, and these may be random or regular, depending on several factors.

In this example, tracking box 29 is of the shape of a rectangle having somewhat rounded corners. The center point of tracking box 29 is preferably placed near an apparent center or median point the entity to be tracked. Thus, signature pixels 32a–n are concentrated on the swim suit of the diver to be tracked.

When tracking box 29 is positioned and activated over an image entity to be tracked, in this case the diver's swim suit, a signature table is created and stored as described above. The spatial arrangement of the signature pixels is a known default pattern within the tracking box. Therefore, when the center of the tracking box in a frame is decided (box placed and initiation signaled) the coordinates of the signature pixels relative to the bit mapped frame are easily calculated. Each signature pixel then has a known value for R, G and B from the video memory array for the frame displayed. This base signature is captured for tracking purposes. These values are entered into a base table as described further below.

Figure 4:
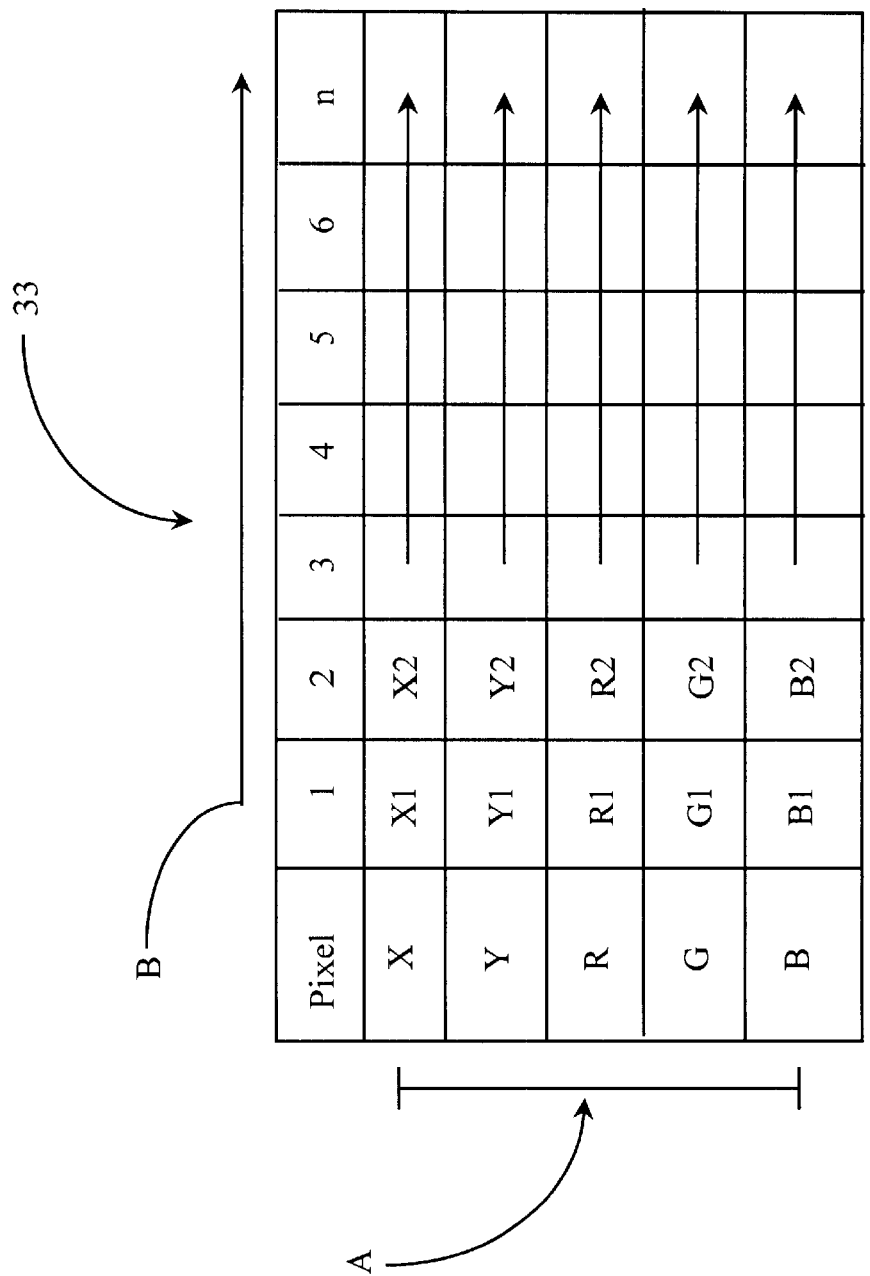
FIG. 4 is a exemplary view of a value table containing values of signature pixels according to an embodiment of the present invention.

FIG. 4 is an exemplary view of a base value table containing values of signature pixels according to an embodiment of the present invention. Value table 33 is created during the initial activation of an image tracking process as described above. Value table 33 contains 5 values per target pixel. A bracketed line A illustrates those 5 values as listed from top to bottom in the first vertical column under Pixel. They are, in order of presentation, X (coordinate), Y(coordinate), R value, G value, and B value. Cartesian coordinates have been assumed for exemplary purposes, but spherical coordinates, or any other coordinate system may also be used.

Each individual pixel is illustrated serially to the right in table 33 as shown by arrow B with the previously described pixel values presented in vertical columns below. For example, pixel 1 shows values X1, Y1, R1, G1, and B1 in a vertical column below. The next column to the right contains pixel 2 and associated values are identically presented. The numbering scheme, of course may any desirable and workable scheme, as the order of calculation is not fundamental to the invention. The representation of value table 33 as illustrated herein is meant only to be an example of a table for storing values. The values being collected and stored may be kept in any logical order such as in a data list or the like.

Once table 33 is created, in the presently described embodiment it remains the signature table for the specific entity being tracked. For example, using the swim suit, table 33 would reflect the x and y coordinates and the RGB values of the signature pixels within and around the suit at the moment the tracking box is activated.

After table 33 is created and stored, which occurs during the time of a single frame at 30 frames per second in this example, a second frame enters the pipeline of the tracking engine. The pipeline is typically 10 frames, but may be more or fewer frames in other embodiments. In the second frame, or the frame following the frame in which the tracking process is initiated and the signature table is created, it must be assumed that the image entity to be tracked has moved. Since there is no way at this point to know the magnitude and direction (vector) of movement, an image testing process is performed to locate the best match for the image signature.

Typically, in a single frame, an entity, unless moving uncommonly rapidly, will not have moved far. A pattern of assumed center points in an expanding spiral around the original center point of the tracking box is therefore assumed and the test pixel pattern at each assumed center point is taken and compared to the stored base signature. The best match to the stored signature is taken to be the new position of the image entity to be tracked, and the center point for the tracking box is recorded. This spiral testing method is performed at each assumed new image position as is further described below.

Figure 5:
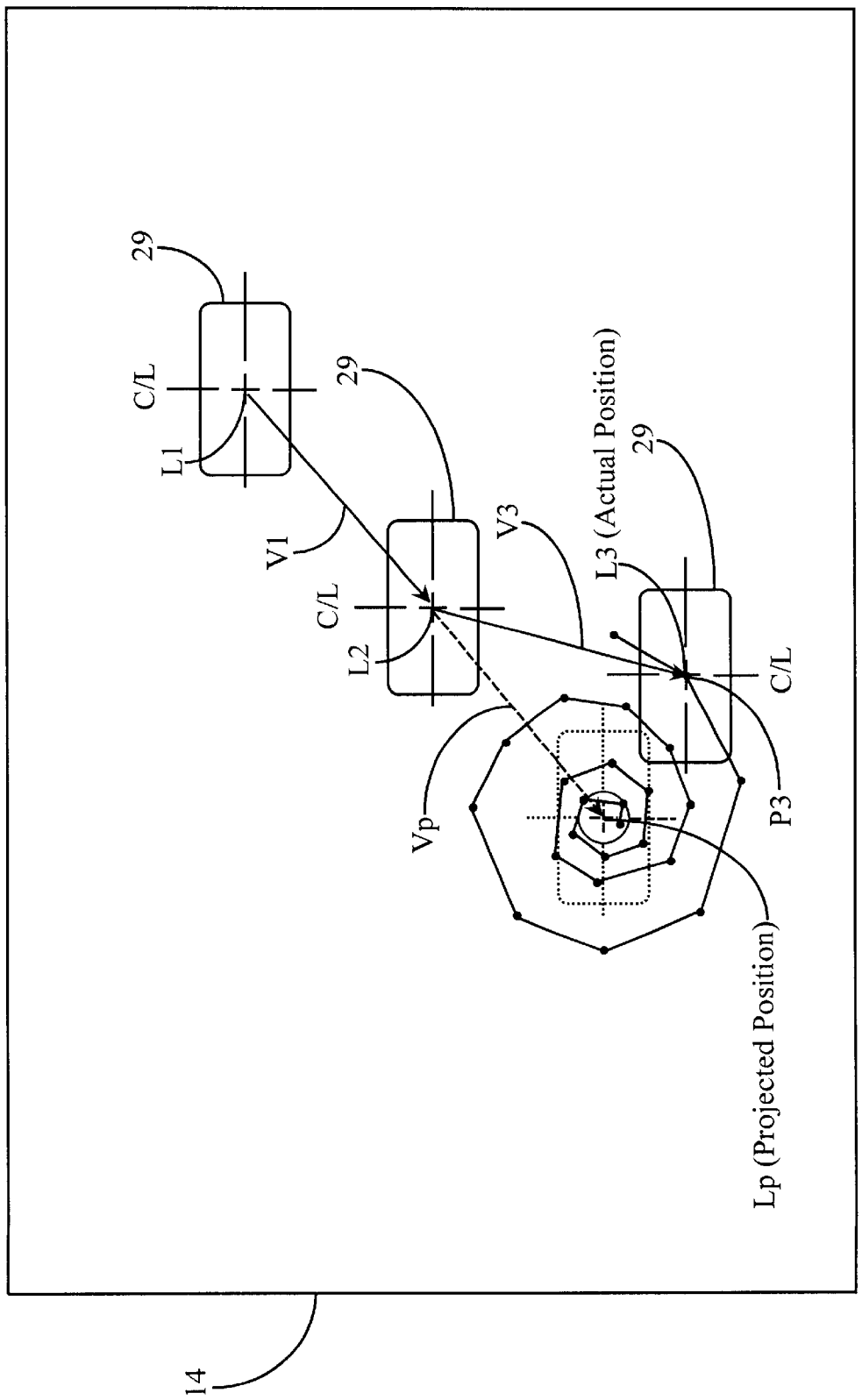
FIG. 5 is a motion diagram illustrating an image tracking process according to an embodiment of the present invention.

FIG. 5 is a motion diagram illustrating an image tracking process according to an embodiment of the present invention. Screen 14 shows a first position L1 of the center point of tracking box 29. This introductory position is the beginning of the tracking process as previously described. L1 has the x and y coordinates of the center point of tracking box 29 at the instant it is placed over an image entity and activated. The image entity itself is not illustrated here for the purpose of simplifying explanation, however, it may be assumed to be present.

In the first iteration the center point tracking box 29 is moved from L1 to L2, shown by vector V1. This first vector is determined by the spiral test pattern as briefly described above, more fully described below. Once this first vector is determined, an assumption is made that a moving entity will typically continue moving in at least nearly the same direction, and at about the same velocity. Therefore, to determine a next assumed position, vector V1 is applied from L2 to determine projected position Lp. At the newly assumed position for the third frame, the spiral pattern test is performed again, and again the best signature match is taken as the correct position for the center point of tracking box 29. The assumed position for the third frame, Lp is now moved to P3, which is found to be the best signature match to the originally stored image signature. At P3 new vector V3 is determined, and V3 is used for the next frame projection.

The process is thus continued from frame to frame, using the last vector as a tool to provide an assumed next position, and then testing that position for accuracy.

In the spiral pattern test, with respect to position Lp, a pattern of 24 points (connected by line segments for illustrative purposes) are illustrated as forming an outward spiral in a counter-clockwise direction from point Lp. A signature comparison is performed at each of the 24 points in order proceeding from Lp, the results are stored, and the best match is found. It will be appreciated by the skilled artisan that the spiral pattern and the order of testing is convenient and not limiting for the invention, as other patterns and orders may well be used.

The unique testing and correcting mechanism in this embodiment is achieved through the use of an algorithm that computes the average root mean square difference of the RGB color values between the colors of the test pixels and the stored signature colors of the target pixels. That is, for each new assumed position, each default pixel position in the test pattern is taken from the video memory array along with R, G and B values. The exemplary root mean square method takes the square root of the sum of the squares of the delta, or deviations, of each pixel color magnitude at each position in the test pattern, sums over all of the pixel pattern, and divides by the number of pixels in the pattern. In this method the best match is determined by the lowest value for the calculation.

The algorithm executes each time a test is conducted for all of the involved test pixels or one time per frame interval, assuming that each iteration is successfully completed in the time of the single frame. If computing time is inadequate, a frame may be skipped. Factors affecting the number of text positions used in an iterative test pattern, such as the spiral position test, include frame speed CPU power, total Image screen-size, and so on.

It will be apparent to the skilled artisan that the least mean square method of comparison of color signatures is a convenience, and not a limitation to the invention. There are a variety of ways the color signatures at assumed image entity positions may be compared with the original image entity signature.

In the embodiment herein described all new and assumed positions for tracking box 29 are tested against the originally-stored image. In an alternative embodiment of the invention, at default intervals, the last best signature is assumed as a new base signature, based on the fact that an image entity, such as actor in a video, may move in a way that the image signature may change.

Figure 6:
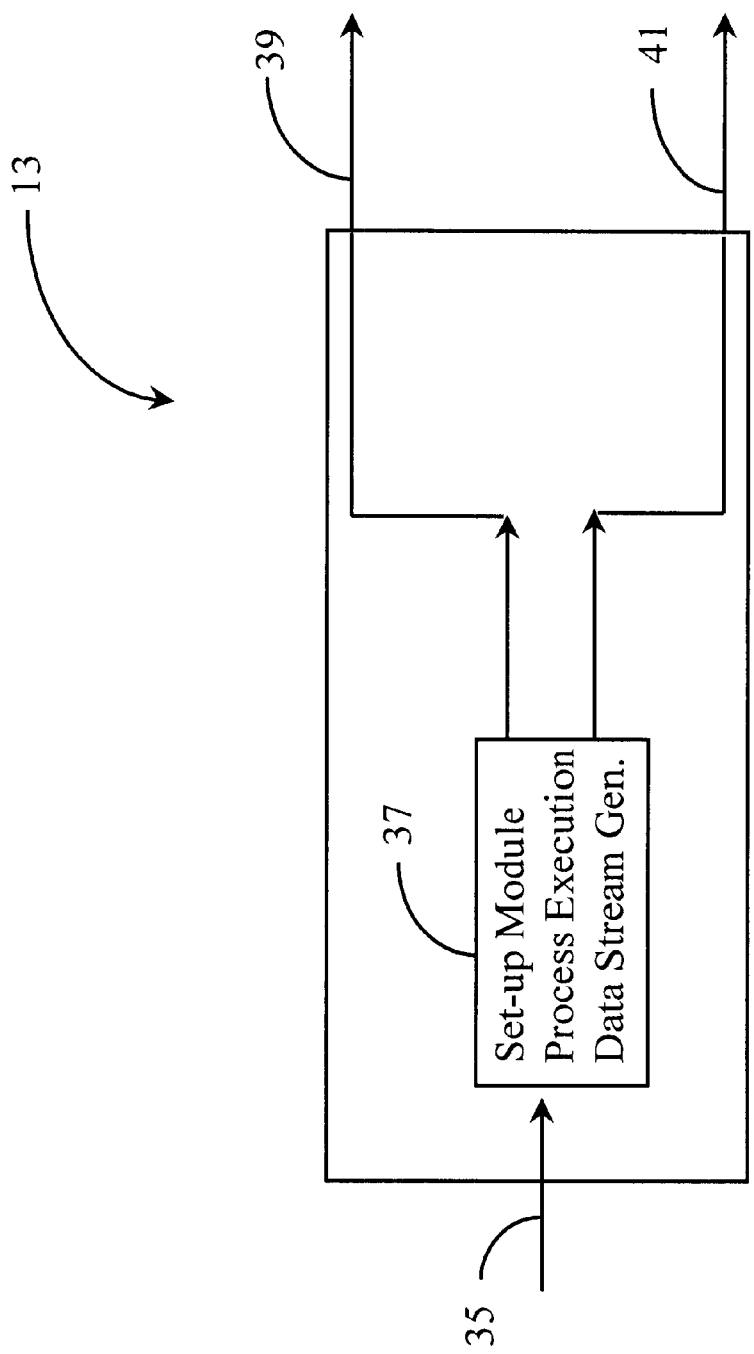
FIG. 6 is a block diagram illustrating a data-stream generator and set-up function of the tracking module of FIG. 1 according to an embodiment of the present invention.

FIG. 6 is a block diagram illustrating a data-stream pipeline and set-up function of the tracking module of FIG. 1 according to an embodiment of the present invention. During the tracking process as described above, a separate data stream is created, synchronous to the original video stream, that contains the coordinate data for the center position of tracking box 29 determined in each frame. As previously described with reference to FIG. 1, this output (combining both streams) is directed back to be viewed.

Tracking module 13 takes in the original video stream illustrated herein via a directional arrow (element 35) into a module 37 responsible for set-up, process execution and data-stream generation. Module 37 is capable of working in a ten-frame pipeline with 16, 24, and 32 bit resolutions. It is important to note here that the parameters of a ten-frame pipeline and 16, 24, and 32 bit resolution capability are exemplary of a preferred embodiment judged by the inventors through empirical method to be adequate for most instances. In other embodiments, other resolutions and frame capacities may be employed.

Set-up includes operations such as pre-selecting tracking box shape and size, pre-selecting number of target and test pixels, and so on. Process execution encompasses initiating and carrying out the automated tracking process including iterative execution of the test algorithm. A data-stream generator produces a data-stream with tracking coordinates for each frame interval which is synchronous to the frame intervals of video stream 35. Although the inventor has chosen to illustrate only one module 37 responsible for three basic functions, it will be apparent to one with skill in the art that three separate modules may be provided with each responsible for one dedicated function.

Two synchronized streams, video stream 39, and data stream 41, are output from tracking module 13. With respect to viewing the tracking process on a display such as screen 14 of FIG. 2, for example, it is desired that there is no visible wavering or other erratic movement of a tracking box such as box 29 of FIG. 2 as this would translate to the end user having an interactive icon or transparent shape that wavers identically when watching the video. Therefore, an additional smoothing module may be provided and executed at a time interval before 10 data-frames leave module 13. This module would use known algorithms to judge and correct x and y coordinate positions to obtain a smoother curve or arc over a 10 frame interval in cases wherein image motion is not in a straight line. The requirement of such a module is not needed to practice the present invention, but rather preferred for further refinement of the end product.

In the interactive system described above a first vector was determined by the spiral testing method described. In another embodiment, the editor who selects and places the tracking box on an entity to be tracked may also move the tracking box (drag) along the apparent path of the moving entity, which in this alternative embodiment creates a series of new positions for the tracking box equal to the number of frames over which the editor drags the tracking box. When the editor drops the box, the tracking engine takes over, using the last vector as an assumption for a new position, as described above, and the tracking continues automatically.

It will be apparent to one with skill in the art that those who advertise and promote products or services may utilize the capability as taught by the present invention to create a venue for the promotion of such products or services. For example, a subscriber (end user) to a service specializing in providing video media wherein interactive advertisements are presented may obtained CPE equipment adapted to display, identify, and provide, through interactive device, methods for obtaining additional information regarding image entities. Such interaction may be a simple mouse click on the entity during playback of the video which may invoke a link to a network-based data-server that may deliver the data to the end user via modem connection or the like.

In another embodiment, the method and apparatus taught herein may be used for interactive teaching purposes wherein a highlighted image entity may be clicked on a special display screen causing related information to appear in a second window or screen associated with a plurality of connected devices such as PC/VDU's used by students participating in the session.

It will be apparent to one with skill in the art that through later video editing techniques, a tracked image may have other created images associated with it such as semi-transparent shapes defining interactive regions, information blocks that follow the image, and so on.

Multi-Image Tracking System Architecture

According to a preferred embodiment of the present invention a unique authoring system architecture is provided which allows multiple authors to track separate images and add annotations including interactive icons, animated graphics, text, audio etc., to a single live or pre-recorded video feed. This is made possible via an innovative synchronous architecture wherein such authoring may be performed in near real-time such that delay of the broadcast video to an end user is negligible.

Figure 7:
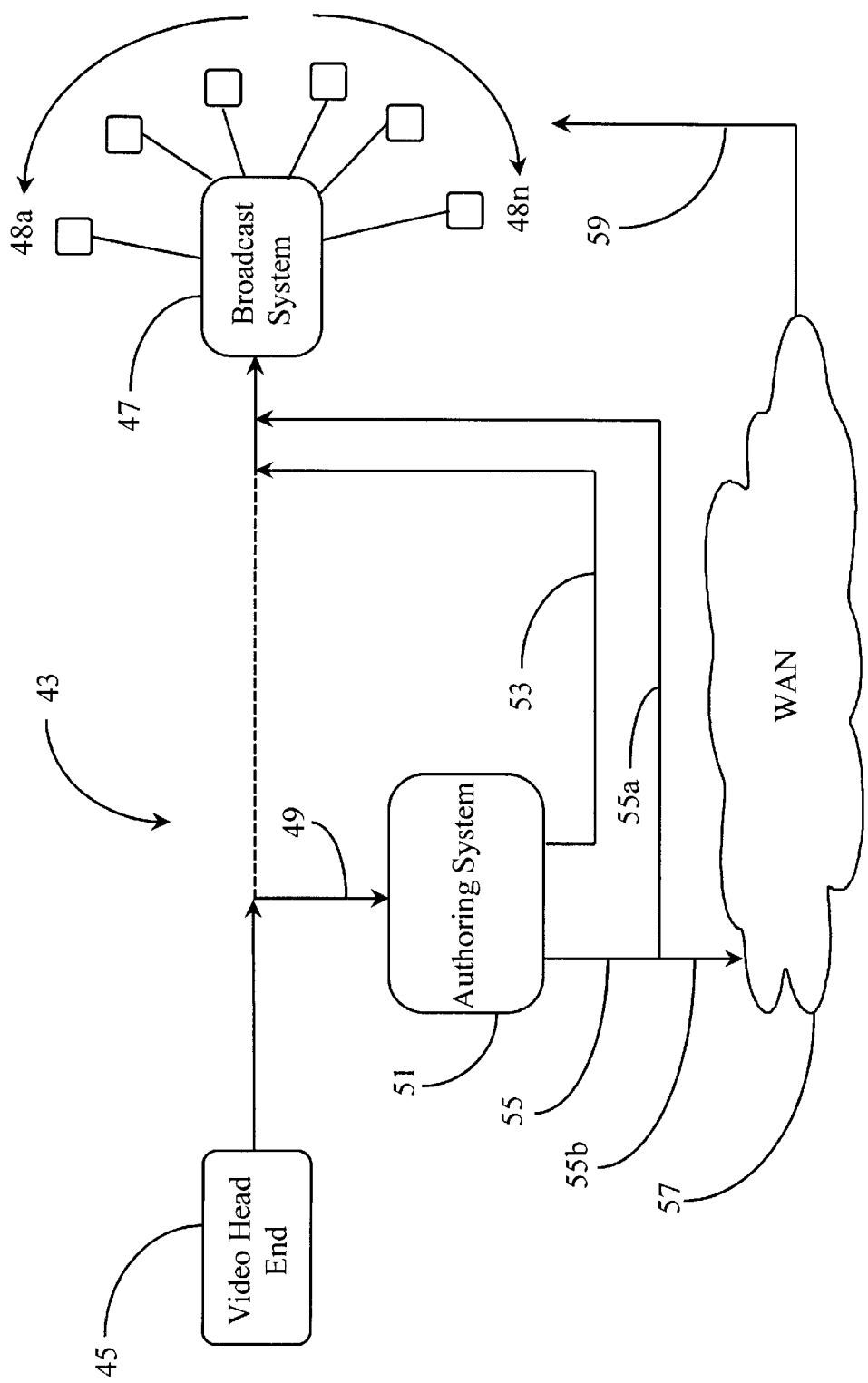
FIG. 7 is a block diagram illustrating a real-time video authoring and delivery system according to an embodiment of the present invention.

FIG. 7 is a block diagram illustrating a real-time video authoring and delivery system according to an embodiment of the present invention. A video capture and delivery architecture 43 is provided and adapted to include the authoring system and architecture of the present invention. Some components of architecture 43 are known and currently practiced in the art. For example, architecture 43 comprises a video head end 45 which is the source of the video stream for the innovative architecture of the invention. Head end 45 may be from live video feed from a video camera at the scene of, for example, a live sporting event. In another embodiment, head end 45 may comprise a prerecorded video feed that is re-broadcast to end users, however, for the purpose of the present invention, an example of a live video broadcast will be used extensively.

Also included in architecture 43 and known in the art is a broadcast system 47. Broadcast system 47 may be any type of system adapted to deliver live or pre-recorded video signals such as via cable TV, Internet delivery, satellite system, network broadcast, etc. Broadcast system 47 delivers the video feed to any number of end users such as are represented here via element numbers 48a–48n. End users 48a–n are shown logically connected to broadcast system 47 for associative purposes only with such logical connections representing typical avenues of media connection such as cable, satellite, and so on.

In a preferred embodiment of the present invention the live video stream from video head end 45 is diverted to a unique authoring system 51 from it's normal path to broadcast system 47, as illustrated via diversion path 49. Alternatively the video feed may just be tapped from its normal path to broadcast system and fed to the authoring system.

Authoring system 51 receives stream 49 for the purpose of authoring the stream as described above. Authoring system 51 comprises multiple dedicated authoring stations equipped with software capable of tracking images within the video stream and adding annotations including interactive icons, text, animated graphics and sounds, as is disclosed in enabling detail below. Due to a unique synchronous architecture which allows multiple image tracking and annotation operations to be performed simultaneously, the resulting output streams, shown here as stream 53 (video stream) and stream 55 (annotation stream) may ultimately reach end users such as users 48a–n via broadcast with minimal or no delay. However, instead of a diversion if the video stream is only tapped from the video head end 45 into the authoring system 51, the video stream 53 may not be used further and the video stream from the head end 45 is sent directly to the broadcast system 47. In some of the further discussion we may assume that the video is diverted and not just tapped from the video head end 45, but as mentioned above this may not always be the case.

With respect to output streams, the fact that there are two separate output streams (53 and 55) shown proceeding from authoring station 51 reflects just one embodiment in which the image tracking coordinates and annotations are contained in one annotation data stream (55) that is separate from stream 53 (video stream). However, it may be desirable to combine the streams before being delivered to broadcast system 47 (after authoring). If the video stream and the annotation data stream are sent separately then they have to be synchronized at the user's equipment so the video presentation may be viewed with the annotated material. One good reason for not combining the two streams immediately on authoring is that annotation stream 55 is not limited to being delivered via broadcast system 47. For example, element numbers 55a and 55b represent annotation stream 55 in states of being delivered to end users 48a–n via alternate or variable routes, such as by an Internet connection.

Stream 55a, in this example, is illustrated as being sent along with stream 53 to broadcast system 47 where the streams are combined before broadcasting. In case of an analog broadcast the annotation data stream (stream 53) may, for example, be sent using the Vertical Blanking Interval (VBI) and synchronized with the video. In case of a digital broadcast (using for example MPEG2 digital video format) this annotation stream may be sent as a private data stream multiplexed with the audio and video streams in the digital broadcast. Annotation stream 55b is alternatively illustrated as being delivered over a wide-area-network (WAN) 57, which may be the Internet or other type of WAN, directly to one, some or all of end users 48a–n via a path 59 which represents collective individual user WAN connections. Likewise, still other known delivery mediums may be used. In some special instances, streams 53 and 55 may be combined before leaving authoring system 51. There are many variable possibilities.

It will be apparent to one with skill in the art that there may be more than one type of broadcast system used in the broadcast of a single video event as shown in this example without departing from the spirit and scope of the present invention. For example, some of users 48a–n may receive streams 53 and 55a via cable, while others may receive the streams via satellite and so on. Similarly, some of users 48a–n may receive data streams through separate media of transport such as stream 53 via cable and stream 55b via Internet and so on. Any combination is plausible provided that the user has appropriate equipment and connections adapted for receiving and displaying the broadcast video and synchronously display the annotation data comprising of tracked entities, icons, text, sounds, animated graphics and the like. The scope of the present invention is not limited by the medium of transport used for transmitting the video and the annotation data stream.

Figure 8:
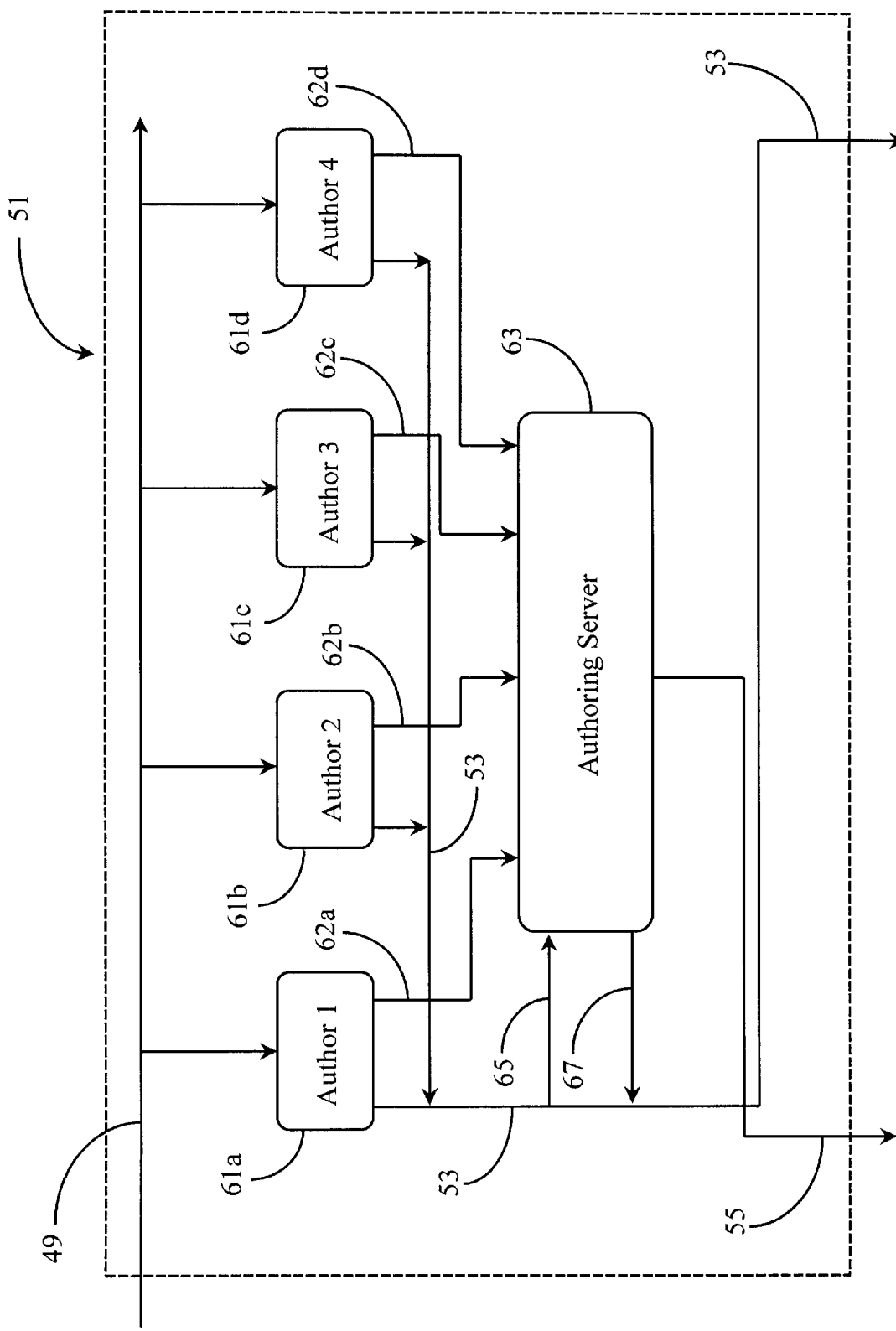
FIG. 8 is a block diagram illustrating multiple authoring station architecture according to an embodiment of the present invention.

FIG. 8 is a block diagram illustrating a multiple authoring station architecture for authoring system 51 according to an embodiment of the present invention. Authoring system 51 comprises a plurality of (in this case 4) authoring stations 61a–61d that are adapted for tracking image entities and providing additional annotation, including annotation regarding tracked entities. An authoring station such as station 61a is analogous to authoring station 11 of FIG. 1 except for added capability, according to embodiments of the present invention, for providing further annotation (other than tracking information) and interactive applications as previously described. More detail regarding such capability is provided below.

Video stream 49 from the video head end enters authoring system 51 and is simultaneously provided to each authoring station in the system, such as stations 61a–d (illustrated via branching arrows). It will be apparent to one with skill in the art that there may be more or fewer than four authoring stations used without departing from the spirit and scope of the present invention. For example, if only two entities are to be tracked, then only two stations may be required to be operational. If there are nine entities to be tracked, then nine stations may be required to be operational. Similarly, each authoring station may or may not be similarly equipped with respect to tracking and annotating. For example, if there are three entities to be tracked and some general annotation (not particularly associated with an image) to be performed, then stations 61a–c may be assigned to tracking and station 61d may be reserved for general annotation and so on.

After authoring is performed via stations 61a–d, as illustrated in this example, there are two streams that are output from each station. One is video stream 53 which in most embodiments will remain unchanged under most circumstances, except for any frame speed adjustments and normalization of video image such as was described with reference to FIG. 1, above depending on the requirements of the video delivery system. The other is an annotation data stream containing annotations such as are individual to each station where annotations are performed. For example, annotation streams 62a–62d are associated with stations 61a–61d respectively. Annotation streams 62a–d differ from each other only in that the annotations contained therein are different as a case of being authored in different stations.

Annotation streams 62a–d are generated so as to be synchronous with stream 53. Therefore, it is ideal that all output streams are running in synchronous mode while leaving each authoring station. Previously described conventions such as the ability of image tracking software to skip frames helps to assure this ideal.

An authoring server 63 is provided and adapted to combine annotation streams 61a–d into one annotation stream 55 which is analogous to stream 55 of FIG. 7. In this way, all annotations performed separately may be combined and may act in unison at the users end. Video stream outputs from the separate stations converge, or more specifically, remerge into video stream 53 as illustrated via a horizontal, left-facing arrow labeled element number 53. Video stream 53 is the normalized video output from each authoring station and typically does not include any annotations.

If there is a known latency with respect to recombining streams 62a–62d in server 63, then video stream 53 must be re-synchronized with annotation stream 55 before stream 55 becomes output. In this case, stream 53 is diverted over path 65 into server 63 and delayed until it is synchronous with stream 55 before it exits server 63 over path 67. In this way, streams 55 and 53 remain synchronous on output from the authoring system. In an alternate embodiment, synchronic delay may be performed in a separate server (not shown). The video stream that is output from system 51 (stream 53) remains essentially unchanged from the video that is input into the system (stream 49) unless the medium of transport of the video stream requires a different video resolution or frame rate. Although it has been previously described that a preferred arrangement for an authoring station such as authoring station 61a is a PC/VDU with a CPU running at least 266 MHz and a Windows platform, it will be apparent to one with skill in the art that other platforms may be used such as a Sun Microsystems workstation, UNIX operating systems, and so on. In the case of differing platforms, differences in functional software architecture will also be apparent.

It will also be apparent to one with skill in the art that video stream outputs which ultimately remerge as stream 53 may be transferred to server 63 and delayed for synchronous purposes and so on, without departing from the spirit and scope of the present invention. In the latter case, it is conceivable as well that if both streams 53 and 55 share entry into server 63, they may also be combined therein and output as one annotated video stream.

Figure 9:
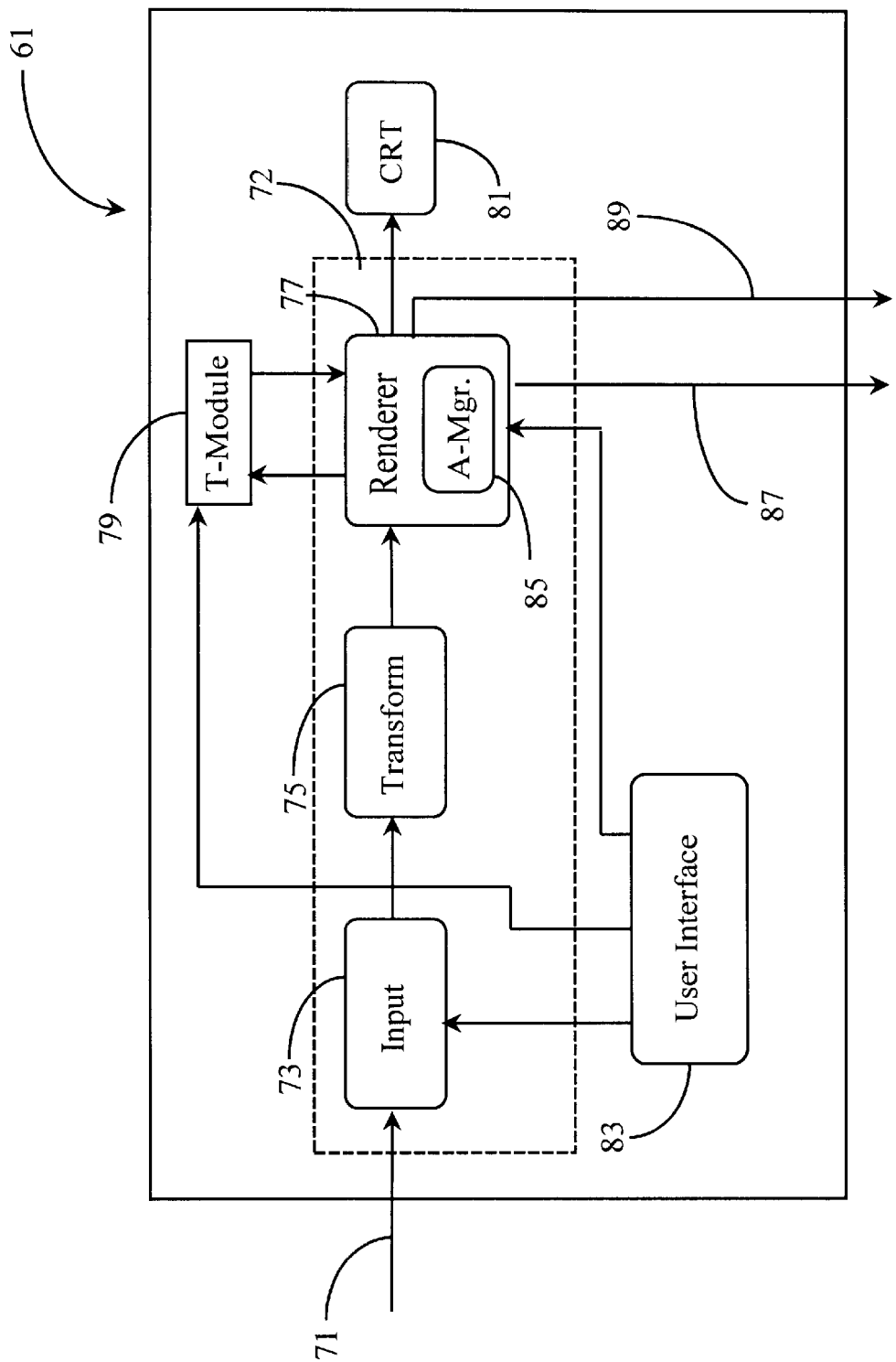
FIG. 9 is a block diagram illustrating an exemplary modular architecture of a single authoring station according to an embodiment of the present invention.

FIG. 9 is a block diagram illustrating an exemplary modular architecture of a single authoring station according to an embodiment of the present invention. Authoring station 61 is provided and adapted to track a moving image entity in a video presentation and to provide tracking coordinates as well as other types of annotation for the purpose of soliciting responses from an end user through interactive device. Authoring station 61 is, in this embodiment analogous to station 61a of FIG. 8. Authoring station 61 utilizes various interfacing software modules in performing it's stated functions as is further detailed below.

The exemplary architecture is just one architecture through which the present invention may be practiced. A CRT module 81 is provided and adapted to display a normalized graphical bitmap image-stream as may be viewed by a person involved in an authoring procedure. A Filtergraph 72 comprises three software filters that are dedicated to performing certain functions. These are input filter 73, transform filter 75, and renderer filter 77. These three filters are responsible for receiving input video from variable sources (input filter), interpreting presented data and forming an image (transform filter), and generating and displaying the actual viewable video stream (renderer filter) comprising of a series of bitmapped frames. Within the domain of filtergraph 72, video frame speed is set at 30 FPS (exemplary), and resolution is set at 352 by 240 pixels (exemplary). This provides a compatible set of parameters for authoring station 61 which is, in this example, a PC/VDU running Windows as previously described.

Input filter 73 is adapted to accept a video input stream 71 which may be sourced from a wide variety of either analog or digital feeds. Examples are live video feeds from satellite, video camera, cable, and prerecorded video feeds from a VCR, CD-ROM, DVD, Internet server, and so on. In addition to video input, filtergraph 72 may also accept input from a user interface module 83 adapted to provide certain controls relating to filter 73 such as video conversion controls, frame rate controls and so on. Control directionality with regards to user interface 83 is illustrated via directional arrows emanating from interface 83 and leading to other components. Such controls may be initiated via keyboard command or other known method such as via mouse click, etc. Transform filter 75 interprets data for the purpose of obtaining bitmap images at a normalized resolution. Renderer filter 77 then draws the bitmap image-stream on CRT monitor 81 for viewing. In another embodiment, CRT 81 may be another type of monitor wherein pixel graphics may be viewed such as are known in the art.

A tracking module 79 (T-module) is provided and adapted to track an image and provide frame by frame tracking coordinates and to be a vehicle through which additional annotations may be provided through user interface 83. For example, through interface 83, an author may set up the parameters for tracking such as are described with reference to FIG. 5 above, as well as add additional annotation such as static or moving image icons, formatted text, animated graphics, sounds and the like. Tracking module 79 is analogous to tracking module 13 of FIG. 1.

Renderer filter 77 is the driver that drives the video display as previously described. Tracking module 79 works in conjunction with renderer filter 77 as illustrated via opposite-facing arrows between the modules. That is, it is at this stage that image tracking and annotation operations actually take place as previously described. For example, the upward facing arrow emanating from renderer filter 77 and entering tracking module 79 represents input stream 71 (in the form of a series of bitmapped images). The downward facing arrow emanating from module 79 and re-entering filter 77 represents output stream 71 and the additional information related to the positions of the entities being tracked. The video presentation is simultaneously being played on CRT 81 as tracking is occurring and is subsequently sent on as output stream 89 from renderer filter 77 which is analogous to video stream 53 of FIG. 8. An annotation manager 85 within renderer 77 converts annotation data, input during annotation processes and the data relating to the tracked entities output from the tracking module, to metadata for more compact transmission in output stream 87. Stream 87 is a data stream containing information about the various annotations added by the author and the tracking co-ordinates of the tracked entities and is analogous to the annotation stream 62b of FIG. 8. Such metadata conversion-data tables for compact transmission in output stream 87 may be stored elsewhere accessible to the CPU powering authoring station 61. User interface 83 provides considerable option and capability for entering commands to add image icons, animated graphics, following tracked objects or static or moving independently in the video in predefined manner, formatted text captions and so on.

In one embodiment, user interface 83 may pre-programmed by an author to supply the appropriate pre-selected annotations in a reactive fashion. That is, according to a specific time interval, a signal could initiate annotation inserts and so on. In other embodiments, an author may physically enter an annotation via pressing a pre-defined key on a keyboard and so on. There are many known methods for inserting annotations.

It will be apparent to one with skill in the art that other software module configurations may be used instead of those presented in this example without departing from the spirit and scope of the present invention. For example, similar functional modules may be provided to be compatible with alternate platforms such as UNIX or Macintosh.

It will also be apparent to one with skill in the art that the bulk of annotation in the form of inserted text, graphical icons, universal resource locators (URL's), interactive shapes, and so on will, in many embodiments, be at least partly associated with tracking coordinates of an image and therefore will depend on those frame by frame coordinates. For example, an interactive icon may follow a moving image entity and be visible by an end user as in case of advertisement logos for sponsors of sportspersons in a sporting event. Text blocks and the like may take similar association. Hence, the specific content of annotations and insertion methods of such annotations may be pre-designed based on known facts about the video stream such as what image is to be tracked for what advertiser who has what URL's and so on. Execution of those annotations may be automatic according to a timed function as described above, or may be performed manually, perhaps using a macro or other designed input function.

In another embodiment, added functionality could be added to user interface 83 which allows for an author to adequately identify an image entity to be tracked so as to be enabled to place a tracking box such as box 29 of FIG. 5 over the entity at a maximally opportune instant during image motion. In this case, once the tracking box in activated, the software could be adapted to allow the author to manually track the object till such a time that the tracking box is placed more or less at the center of the object in the video. A synchronization module could be added in authoring server 63 and adapted to synchronize separate annotation streams before combining them and synchronizing them with the output video stream which is stream 53 in our example.

System for Synchronizing Data Streams Delivered Over Separate Networks

According to a preferred embodiment of the present invention, a unique synchronization system is provided and adapted to overcome unpredictable latency inherent in delivery of data-streams that are delivered over separate delivery media to end users. The method and apparatus provided and taught herein for this unique purpose is two-fold. Firstly, a video/data stream signature operation is executed after coordinate tracking and annotation operations are performed in an authoring station such as was described above with respect to authoring station 61 of FIG. 9. The signature streams are then sent to their respective broadcast and/or data-transmission systems to be sent to an end user. Secondly, a video/annotation stream capture and synchronization operation, executed via software on customer premises equipment (CPE), must be executed at the user's end before a single combined stream may be viewed by the user.

Figure 10:
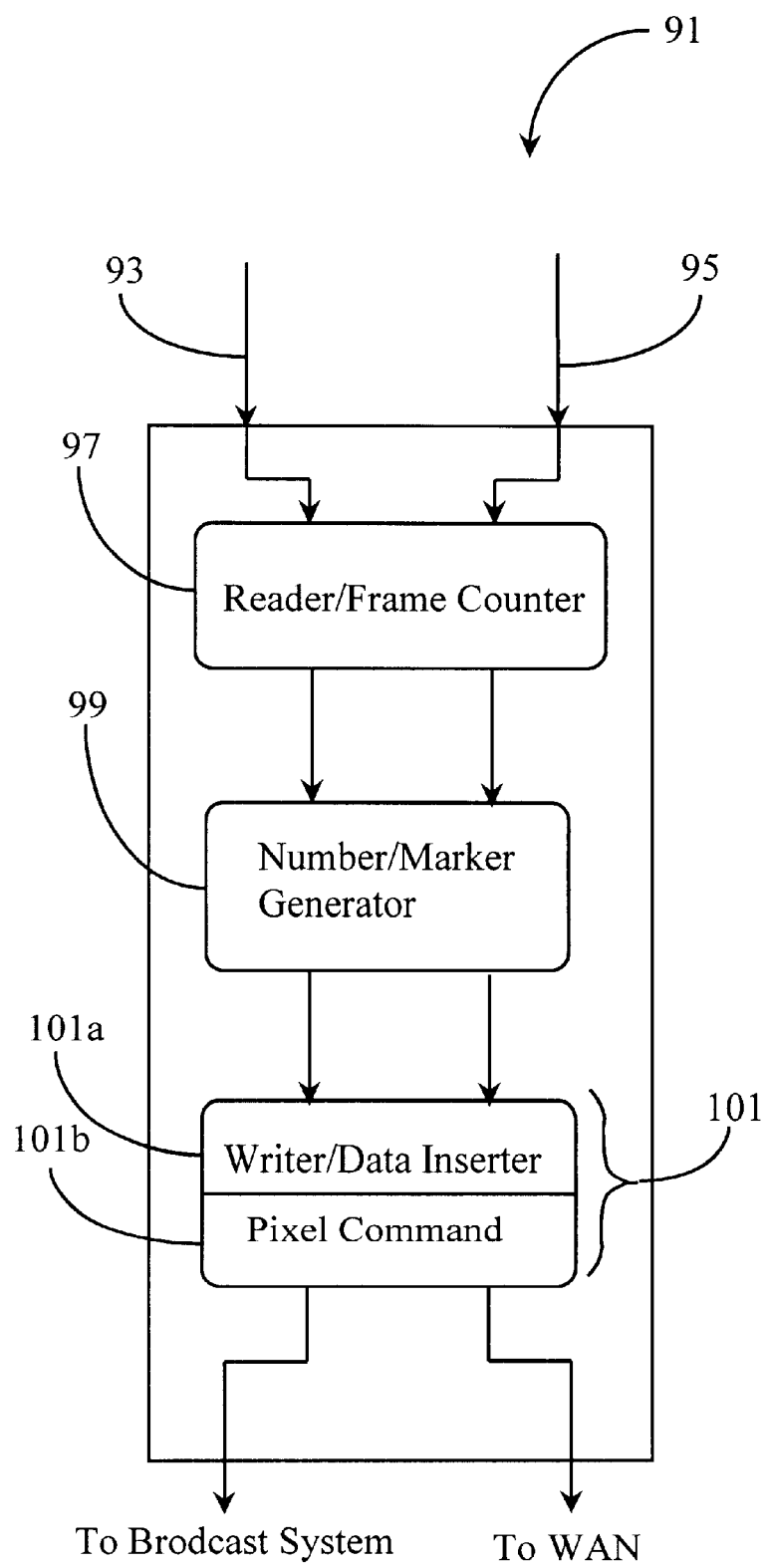
FIG. 10 is a block diagram illustrating a signature application apparatus at the authoring end according to an embodiment of the present invention.

FIG. 10 is a block diagram illustrating a signature application apparatus at the authoring end according to an embodiment of the present invention. A signature application module 91 is provided in this embodiment in the form of a software application module resident in an authoring server such as server 63 of FIG. 8. Module 91 is initiated in server 63 after tracking and annotation has been performed.

Separate data streams (video and annotation) are given frame-specific identification and marking so that they may latter be synchronized by using inserted data corresponding to the frame-specific identification.

A video stream 93 is shown entering signature module 91. Video stream 91 is analogous to stream 53 of FIG. 8. An annotation stream 95 is similarly illustrated as entering signature module 91. Annotation stream 95 is analogous to stream 55 of FIG. 8. Streams 95 and 93 are synchronous as they enter module 91. Synchronization has been achieved after image tracking and authoring in authoring server 63 of FIG. 8, as described in detail above. Synchronization after separate broadcasting is much more complicated and is described in enabling detail below.

Referring back to FIG. 10, in this embodiment, a frame reader/counter module 97 is adapted to read video stream 93 and annotation stream 95 for the purpose of recording an association of annotation data to video-frame data using a serial count of each frame. Because annotation stream 55 of FIG. 8 was generated at the time of tracking an entity within video stream 53 of FIG. 8, each stream comprises a same number of frames constituting an entire stream length. Therefore, it is possible to count and associate individual frames in serial fashion. A number/time marker-generator module 99 generates code to represent frames in annotation stream 95 and also to represent time markers in video stream 93. Further binary numbers are generated for use in a pixel signature method described more fully below.

According to a preferred embodiment of the present invention, three separate signature methods, each method using one sequence of binary numbers described above, are executed via signature module 91 in the course of it's function. Using three separate signatures insures that at least one of the applied signatures will successfully pass on to the end user's equipment. All three methods share a common goal, which is to record in one of two data streams to be later synchronized, at regular intervals, a marker, and information denoting which frame from the other of the two data streams should be displayed at the marker for the two streams to be properly synchronized.

In one of the three methods a number denoting frames in one of the two data streams is inserted into video blanking intervals (VBIs) of the other data stream. Although it is possible to insert such a synchronizing number in each VBI for the carrying stream, it is not necessary to do so for synchronizing purposes. Typically the synchronizing number need be inserted only once in several frames, and the fact of such a number appearing in a VBI can serve also as a marker; that is, the appearance of the number in a VBI can be taken to mean that the associated frame from the companion stream is to be displayed with the "next" frame in the carrying stream. The convention could also be applied to any frame follow g the "next" frame.

In a second method the identifying number is inserted in one or another of the horizontal blanking intervals (HBI) of a frame in the carrying stream. The particular HBI is known by convention, and more than one HBI may be used as a "belt-and-suspenders" approach. In this method the marker may be also by convention, such as the "next" frame, or some number of frames following the "next" frame.

A third method for synchronization signature according to an embodiment of the present invention involves altering pixel data in a manner to communicate a binary number to a system (described further below) at the user's end programmed to decode such a number from a carrying data stream. In this method, in the carrying data stream, the data stream values for an "agreed-upon" pixel are altered. For example, for one particular pixel in a frame, the R,G, and B values (or, in appropriate instances, the Y, U, and V values) may be arbitrarily set to zero to denote a zero bit in a binary signature, and in following frames the values for the same pixel may be set to maximum value (all 1's) to denote a binary 1 bit for the signature. In this manner, over several frames, a binary number denoting a particular frame from the companion data stream may be inserted.

In this pixel alteration method, a marker is also needed. Again, the marker can be by convention (preferred), such as the third frame after the end of a decoded signature, or the same sort of coding may be used to insert a binary marker signature.

In the pixel insertion method, any pixel may be used by convention, but some may serve better than others. For example, in some instances jitter problems may make pixel identification relatively difficult. In a preferred embodiment, wherein a logo is used to identify a data stream, such as a network logo seen in the lower right of frames for some networks, a particular pixel in the logo may be used, which would serve to alleviate the jitter problem.

It will be apparent to the skilled artisan, giving the above teaching, that there will be a variety of ways pixel data may be altered providing a coding system for a synchronization signature. For example, the R, G, and B values may be altered differently by convention, providing three signature bits per pixel, and more than one pixel may be used; so a coded number of virtually any binary length may be provided with the data for a single frame in a video data stream.

In a preferred embodiment of the present invention, all three methods of stream signature, VBI, HBI, and pixel alteration are used. The reason for this is because it is possible that other systems downstream (toward broadcast, or in some rebroadcast) may use VBI's and HBI's to bear certain data, thus overwriting some or all data that may be inserted in blanking intervals via methods of the present invention. Similarly, a logo or other graphical alteration such as a commercial may be inserted into a video stream thus overriding a planned pixel alteration in a significant section of the video. By using all three methods at the authoring end survival of the synchronization information at the user's end is assured.

Referring back to FIG. 10, a frame writer and pixel command module 101, comprising sub-modules 101a, and 101b, uses previously generated data to insert time markers and binary numbers into frame data of at least one of the data streams (93 and 95), as well as causing alteration to one or more pixels over a series of frames to create a serial transmission or physical marker that may be associated with frame numbers assigned to matching frames within annotation stream 95.

It will be apparent to the skilled artisan that either data stream may be the carrying stream. As a convention the primary video data stream is used as the carrying stream rather than the annotation stream.

In some embodiments, a natural screen change convention may be used for markers. For example, known software may be provided and adapted to detect screen changes wherein a majority of pixel values show significant alteration. These screen changes will happen randomly throughout the video and typically are spaced over a number of frames.

It will be apparent to one with skill in the art that module 91 may be programmed according to predetermined criteria without departing from the spirit and scope of the present invention. Such criteria may vary according to factors such as density of annotation data in a particular annotation stream, normal frame rate of the video, whether or not it is known if there will be any further annotation before broadcasting, and so on. For example, a timing marker may be taken every 5th frame instead of every 10th frame. Screen-change marking may or may not be used. There are many variables that may be considered before applying the innovative signature methods of the present invention. Presenting the combined signatures insures that re-synchronization remains possible at the user's end as previously described.

Figure 11:
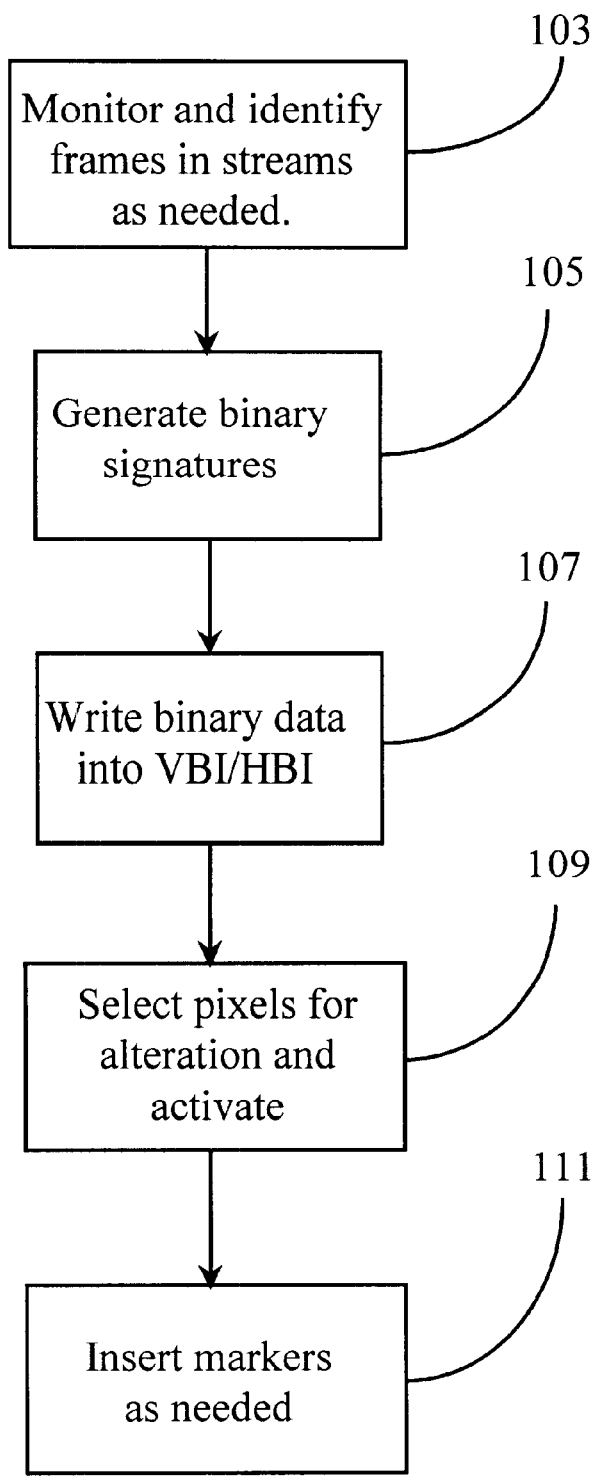
FIG. 11 is a process flow chart illustrating logical steps of providing a signature at the authoring end according to an embodiment of the present invention.

FIG. 11 is a process flow chart illustrating logical steps for providing a synchronization signature at the authoring end according to an embodiment of the present invention. At step 103 the frames of the two streams are identified and monitored as necessary. The software may determine, for example, the scope (density) of annotation, the status of available VBI and HBI areas, the frequency of frames for time marking intervals, and so on. This step also includes counting frames for the purpose of generating annotation frame numbers for signature association purposes. In step 105, serial binary numbers are generated in separate sequences that may be used for time marking, physical marking, and frame association.

In step 107, annotation frame numbers are written into VBI and HBI areas associated with video frames as well as to the appropriate annotation frame headers. If a concerted pixel alteration method is pre-determined to be used as a marking scheme, then the pixel or pixels are selected, altered, and activated in step 109.

It will be apparent to one with skill in the art of video editing including knowledge of video-frame structure and the techniques for writing data into such video frames that there are many variations possible with regards to time marking and assigning identifying numbers to data frames wherein such numbers are also added to video frames. For example, differing frame intervals may be chosen as time markers, different bit structures may be used such as 16, 24, or 32 bit resolutions, and so on.

With reference to the stated objective of the present invention as previously described above, it was mentioned that the method of the present invention involves a second phase wherein separate data streams, marked via the conventions above, arrive at a user location after being sent via alternate mediums, such as one via cable broadcast, and one via a wide area network (WAN) delivery wherein, after receiving the streams, the user's equipment captures, re-synchronizes and combines the streams to be displayed for viewing as one annotated video stream. Such a CPE apparatus and method is provided and taught below.

Figure 12:
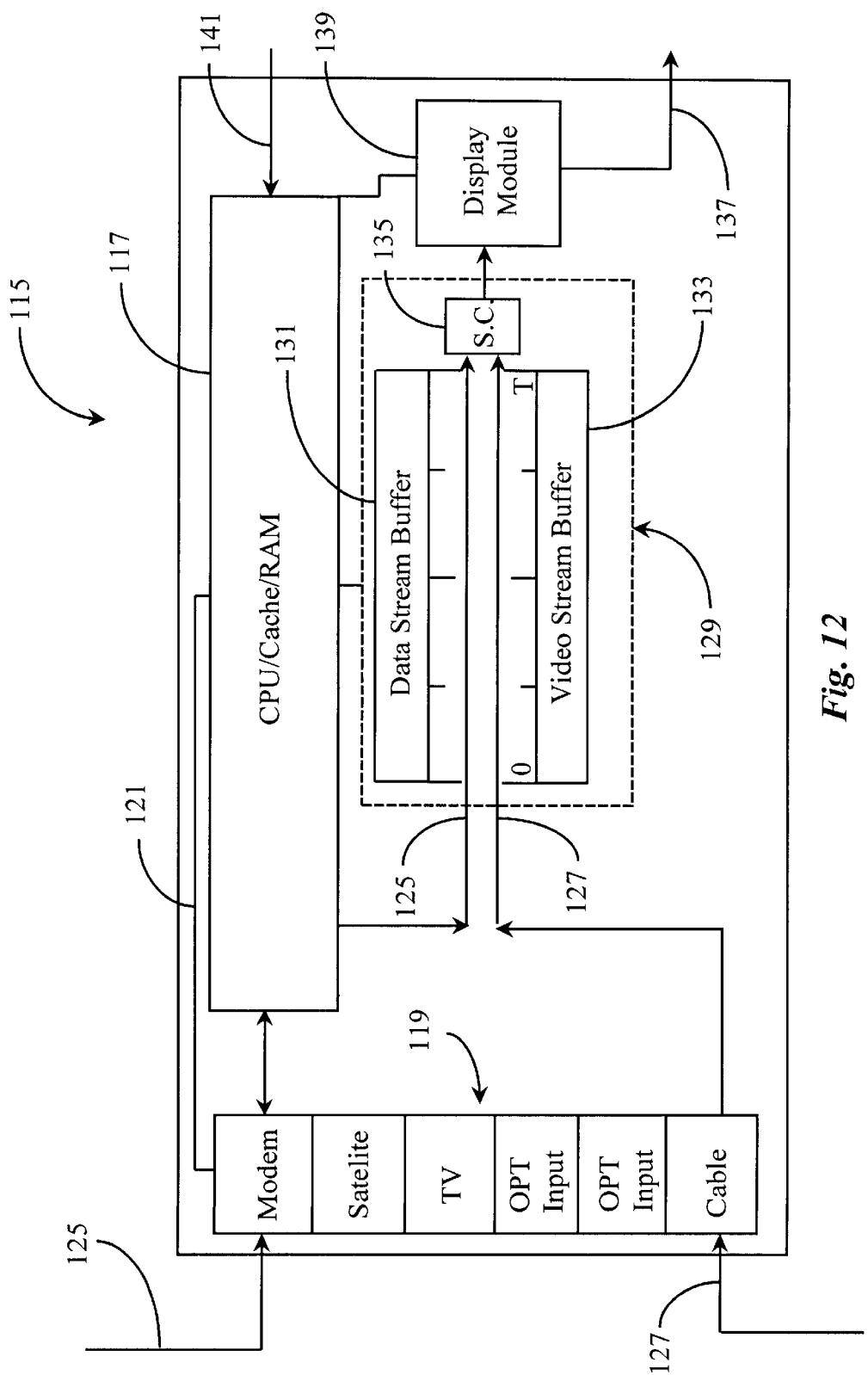
FIG. 12 is a block diagram illustrating a data capture and synchronization device at the user's end according to an embodiment of the present invention.

FIG. 12 is a block diagram illustrating a data capture and synchronization system at the user's end according to an embodiment of the present invention. System 115 is provided and adapted to receive broadcast data-streams from varying sources and combine and synchronize the streams so the data from the two different streams may be integrally displayed as authored. System 115 has a central processing unit (CPU) 117 that has a cache memory and random access memory (RAM). System 15 may be integrated with a computer or components thereof, a WEB TV or components thereof, or another type of receiving station capable of capturing and displaying broadcast video.

System 115 further comprises a signal receiving module 119, illustrated as connected to CPU 117 via bus structure 121. Bus structure 121 is the assumed connection to other illustrated modules within device 115 although an element number does not accompany the additional connections. Module 119 is shown divided into sub-modules with each sub-module dedicated to capturing signals from a specific type of medium. In this case, there are six sub-modules that are labeled according to medium type. From top to bottom they are a modem, a satellite receiver, a TV receiver, a first optional input port (for plugging in a peripheral device), a second optional input port (for plugging in a peripheral device), and a cable receiver. The optional input ports may accept input from Video Cameras, DVD's, VCR's, and the like.

In this particular example, an annotation data stream 125 is illustrated as entering system 115 through a modem, as might be the case if an annotation data stream is sent to an end user via the Internet or other WAN. A video broadcast stream 127 is illustrated as entering system 115 through the sub-module comprising a cable receiver. Streams 125 and 127 are analogous to streams 95 and 93, respectively, as output from signature application module 91 of FIG. 10. Video stream 127 in this example is a live broadcast stream in digital form. Annotation stream 125 is delivered via a WAN which in a preferred embodiment will be the Internet. As such, stream 125 arrives as data packets which must be sorted as is well-known in the art.

System 115 further comprises a pipeline module 129 adapted to accept both streams 125 and 127 for the purpose of synchronization. Pipeline 129 is illustrated as having a time-begin mark of 0 and a time-end mark of T. The span of time allowed for buffering purposes may be almost any increment of time within reason. The inventors have has determined that a few seconds is adequate in most instances.

Video stream 127 flows trough pipeline 129 via a controllable buffer 133. Similarly annotation data stream 125 flows through pipeline 129 via controllable buffer 131. It is important to note here that either stream may arrive first to pipeline 129 and that neither stream has a predictable latency. The only constant factor between the two streams at this entry point are that they are both running at the same frame rate.

Innovative software is provided and adapted to read the time-marker and data-frame numbers in the carrying stream and to compare the indicated frame number for the opposite stream to the actual frame position relative to the carrying stream in the pipeline. The system is adapted to adjust either data stream toward synchronization of the two streams. For example, CPU, through executing the software, may repeat frames in a pattern in either data stream to slow that stream relative to the opposite stream. The software in a preferred embodiment performs this calculation for every detected time marker in stream 127.

Buffering alteration parameters will depend upon the frequency of time markers and the extent of error detected in timing between the two data streams. For example, it is desired to produce what is termed in the art to be a soft ramp effect so that sudden movement or jumping of annotations related to video entities as viewed by a user does not noticeably occur. Similarly, latency factors are unpredictable regarding both streams during the entirety of their transmissions. Therefore, buffers 131 and 133 are utilized continually to synchronize streams 127 and 125 as they pass through pipeline 129. Synchronization error toward the end of pipeline 129 is small enough so that the signals may be combined via a signal combining module 135 before they are sent on as one stream into typically a video RAM of a display module 139.

A single annotated video-stream 137 is output from display module 139 to a suitable connected display monitor or screen. An input signal 141 represents user interaction with an entity in video stream 137 as it is displayed. Such a signal may trigger downloading of additional detailed information regarding the subject of interaction. Interaction signal 141 results from a mouse click or other input command such as may be initiated via a connected keyboard or the like.

It will be apparent to one with skill in the art that the architecture illustrated herein is but one example of a data stream capture and synchronization system or device that may be integrated with other equipment without departing from the spirit and scope of the present invention. In one embodiment, system 115 may be part of a computer station. In another embodiment, system 115 may be part of a set-top box used in conjunction with a TV. There are various possibilities. Moreover, there may be differing modular components installed in system 115. For example, instead of providing a dial-up modem, WAN connection may be via satellite and the modem may be wireless.

In one embodiment, a broadcast video stream without audio narration may be synchronized to a separately received audio stream. Furthermore, a prerecorded and authored video feed from a source connected to an optional input module may be synchronized with a previously stored and annotated data stream from a source connected to a second optional input module as long as the signature process was applied to both streams according to the embodiment of FIG. 10. Interaction with tracked entities and the like associated with the prerecorded streams may be sent to a participating Internet server or the like through the modem sub-module provided the system is on-line during viewing.

Figure 13:
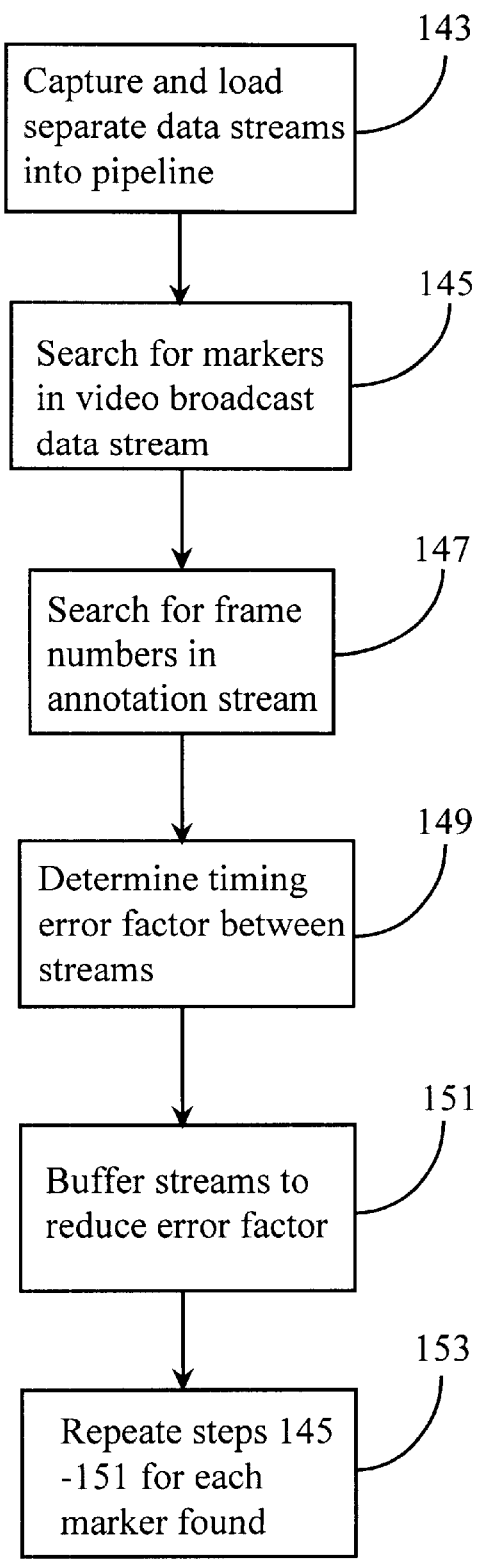
FIG. 13 is a Process flow chart illustrating logical steps for capturing and synchronizing separate video streams for user display and interaction according to an embodiment of the present invention.

FIG. 13 is a Process flow chat illustrating logical steps for capturing and synchronizing separate video streams for user display and interaction according to an embodiment of the present invention. In step 143, separate data streams are captured and redirected into a synchronization pipeline such as pipeline 129 of FIG. 12. Time markers, and if applicable, screen-change markers are searched for and detected in step 145. In step 147, data-frame ID numbers are searched and compared to data-frame numbers inserted in marker frames of a video stream such as stream 127 of FIG. 12. The data may be inserted in VBI and HBI areas or as coded numbers added previously by pixel manipulation.

In step 149, a timing error is calculated with regards to data inserted in a marker frame in the video stream as matched to data in an annotation data-frame closest to the marker. The error will define an annotation frame as being n number of frame intervals ahead of or behind the target marker frame. In step 151, the stream determined to be running n number of frames ahead is buffered to reduce the error. In step 153, the process repeats (steps 145–151) for each successive marker in the video stream.

The process steps illustrated in this embodiment are intended to be exemplary only. The order and function of such process steps may vary according to differing embodiments. For example, in some embodiments wherein it may be known that no further annotation will be performed after signature operations, then only time marker intervals with VBI inserted data may be used. In another such instance, it may be determined that only screen change marking and HBI inserted data will be used, and so on.

In a preferred embodiment, the method and apparatus of the present invention is intended for a user or users that will receive the video data via broadcast, and the annotation data via a WAN, preferably the Internet. This is so that additional data obtained by a user through interaction with a tracked entity in the video may be personalized and specific to the user. In a case such as this a user would, perhaps, obtain a subscription to the service. In other embodiments, other broadcast and data delivery methods may be used.

Hypervideo and Scene Video Editor

In another aspect of the present invention, a video editor is provided for editing video streams and corresponding annotation streams and creating new video and synchronous annotation streams. The editor in a preferred embodiment comprises a software suite executable on a computer platform similar to the various platforms described above related to the coordinate tracking and annotating systems (authoring) of FIG. 1. The editor in some embodiment manipulates data streams in the well-known MPEG format, and in others in other formats. The format under which the editor performs is not limiting to the invention, and in various embodiments the system includes filters (translators) for converting data streams as need to perform its functions.

The Editor is termed by the inventors the HoTV!Studio, but will be referred to in this specification simply as the Editor. The Editor in various embodiments of the present invention may operate on computer platforms of various different types, such as, for example, a high-end PC having a connected high-resolution video monitor. As such platforms are very familiar to the skilled artisan, no drawings of such a platform are provided. Instead, descriptive drawings of displays provided in a user interface are used for describing preferred embodiments of the invention. It may be assumed that the editor platform includes typical apparatus of such a platform, such a one or more pointer devices and a keyboard for user data entry. Platforms used as editors in embodiments of the invention may also be assumed to include or be connected to adequate data storage capacity to store a plurality of video data streams, and one or more ports for inducting such data streams.

Figure 14:
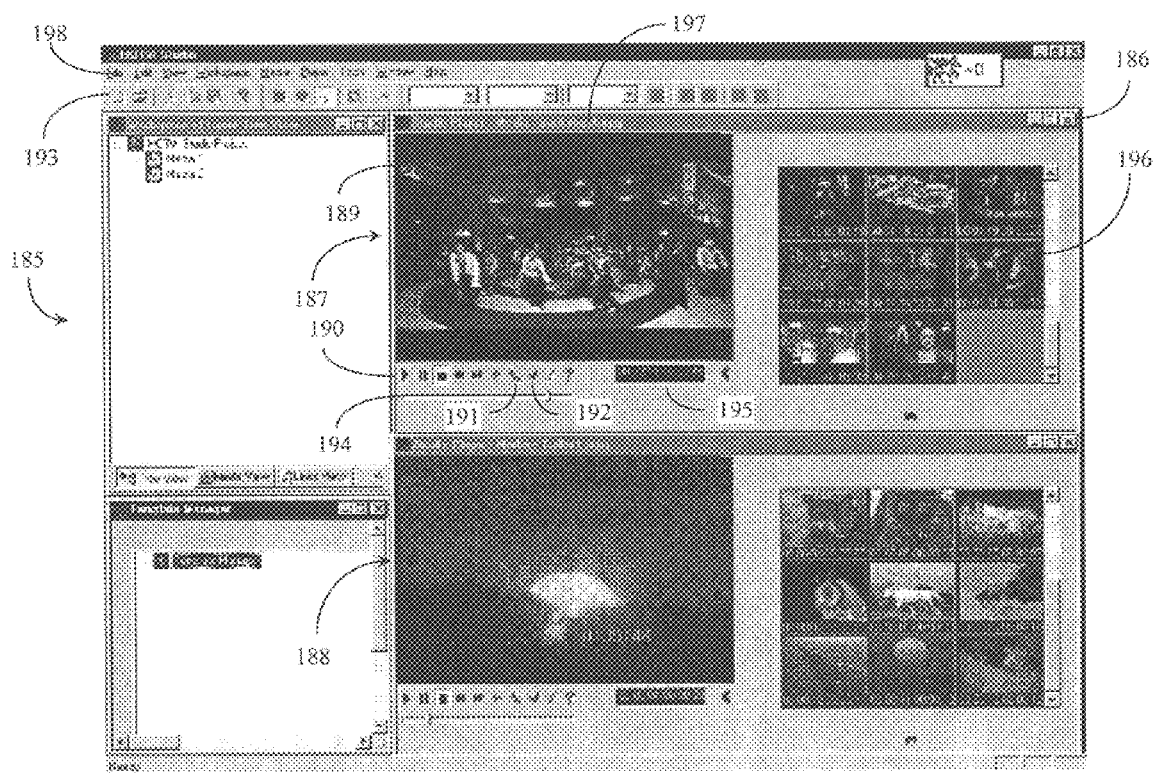
FIGS. 14 and 15 are illustrations of a graphic user interface of a video editor according to an embodiment of the present invention.

In one embodiment of the invention, when an operator invokes the Editor, a main window 185 appears, as shown in FIG. 14. This window is a control window providing menus and icons for invoking various functions related to the Editor. It will be apparent to the skilled artisan that this control window may take a variety of different forms, and the form shown is but one such form. Window 185 in this embodiment has iconic selectors 186 for minimizing, maximizing and closing, as is well-known in the art, drop-down menus 198 providing menu-selectable functions, and a taskbar 193 with iconic selectors for the functions of the drop-down menus.

The File menu in this embodiment includes selections for File; Tools; Window; Options; and Help. Under File in this embodiment one can select to create a new video file, open an existing video file, or import a file while simultaneously transforming the file from any supported format, such as AVI, ASF, MPEG, and so on for video, or WAV and other formats for audio.

Under the Tools menu in this embodiment one may select functions for audio mixing, audio replacement, or for multiplexing audio and video. Under Windows one may select functions to determine how windows are presented, such as Tile Horizontally, Tile Vertically; Cascade; and Close Stream. Under Options one may select functions to set the image editor path, temporary volume path, temporary encoded files, and so forth. The Help menu provides functions for guiding a user through the functionality of the Editor application.

At the heart of the Editor is a display window with selectable functionality for playback and editing. FIG. 14 illustrates one such display window 187. When one creates a new file or selects a file from storage, a display window is opened for the file. An existing file will have a name and storage path, and for a new file the user will be provided a window (not shown) for naming the new file and designating the storage path. Such windows are well-known in the art. In the file window the name and path is displayed in a title bar 197, which also displays a frame number and/or time of the video, in a display area 195.

A slider 194 is provided in this embodiment to indicate to a user the approximate position in the overall file for the frame displayed. In some embodiments one may drag the slider to force the display to a new frame position, and in some embodiments the slider is display only.

Play and editing functions are enabled in this embodiment by selectable icons in a taskbar 190. Included in the taskbar are functions for Play, Pause, Go-To-End, Go-To-Beginning, Fast Forward, and Fast Reverse. In addition there are selectable functions for marking (blocking) portions of a file for editing functions such as Cut, Copy, and Paste functions. It will be apparent to the skilled artisan that other functions may be included by appropriate icons and menus.

In a preferred embodiment of the invention a user can open and create multiple data streams, each of which will be represented by an editing window such as window 187. The user may also select the arrangement for the display of the windows. FIG. 14 shows a tiled arrangement 187, 188 of multiple windows, which may be manipulated by a user to accomplish editing of one or more of the data streams represented. A user can, for example, select portions of one stream, Copy the portion, and Paste the portion into another data stream. The user may also Cut selected portions and Paste, and mark position in a receiving data stream for a Paste to be done.

In addition to the traditional editing functions, there are also special effects that may be accomplished. With a Special Effects window (not shown), which a user may invoke from any one of the editing windows, the user may accomplish special effects on any selected frame in a data stream. The Special Effects Window provides a scrollable list of special effects that a user may choose for accomplishing the selected effect in a frame of a video stream. Among the special effects are Adding Text of a Bitmap to a frame, Merging Frames, Fade In or Out, and Alpha Merging frames. Other effects may be added to the list in other embodiments.

Given the editing functionality taught above, users are provided with a full-featured package with the Editor to create and edit video data streams and associated audio streams.

In yet another aspect of the present invention the video editor application is provided wherein visual thumbnails are widely used in editing functions. In HoTV!Studio window 185, stored video files may be opened in separate windows within the editor window. Two such file windows 187 and 188 are shown in editor window 185. File window 187 is, in this example, a video clip titled backstreet.mpg, and file window 188 is for a video clip titled trailer1.mpg. The functionality of each of the file windows shown, and other such file windows, is the same. Therefore only file window will be described in detail here. It may be assumed that the others operate in a similar fashion.

File window 188 (and other such windows) has a display region 189 where the video file may be played and reviewed. A tool bar 190 has selectable icons (buttons) for controlling playback, and the button functions are intentionally crafted to resemble the familiar physical input keys on a video cassette recorder (VCR). There are, for example, from left to right, a button for Play, Pause, Stop, Rewind, and Fast Forward. The next button, shaped as an arrow is presently undefined. There are then two buttons 191 and 192 for marking a place in the video stream. Button 191 marks a beginning of a selection, and button 192 is used for marking the end of a selection. By use of these two buttons an editor may mark selections of the file for editing functions.

Editing functions in this embodiment are selectable from an editing window toolbar 193 which also displays selectable function buttons for such as file and view functions. The primary editing functions shown here are Cut (scissors), Copy (two files side-by-side), and Paste (a file on a clipboard). These are familiar icons to the skilled artisan. Functions may alternatively be selected from drop-down menus, whose titles show here, and, as is known in other Windows-based applications, the tool bars may be moved about as palettes for easy access by an editor.

In window 187 and other such windows a slide bar 194 is presented for indicating the position of the display in a video file. The slide bar is active. That is, one may drag the slide bar with cursor control, and the video display will follow. In addition to the slide bar a time field 195 shows the relative position by time of the display in display region 189. Time field 195 in this example indicates the display is at 3 minutes and 14 seconds in an overall file time length of 3 minutes and 45 seconds. As a video file is played in region 189, the position time will be seen to change, and the overall time will not.

Figure 15:
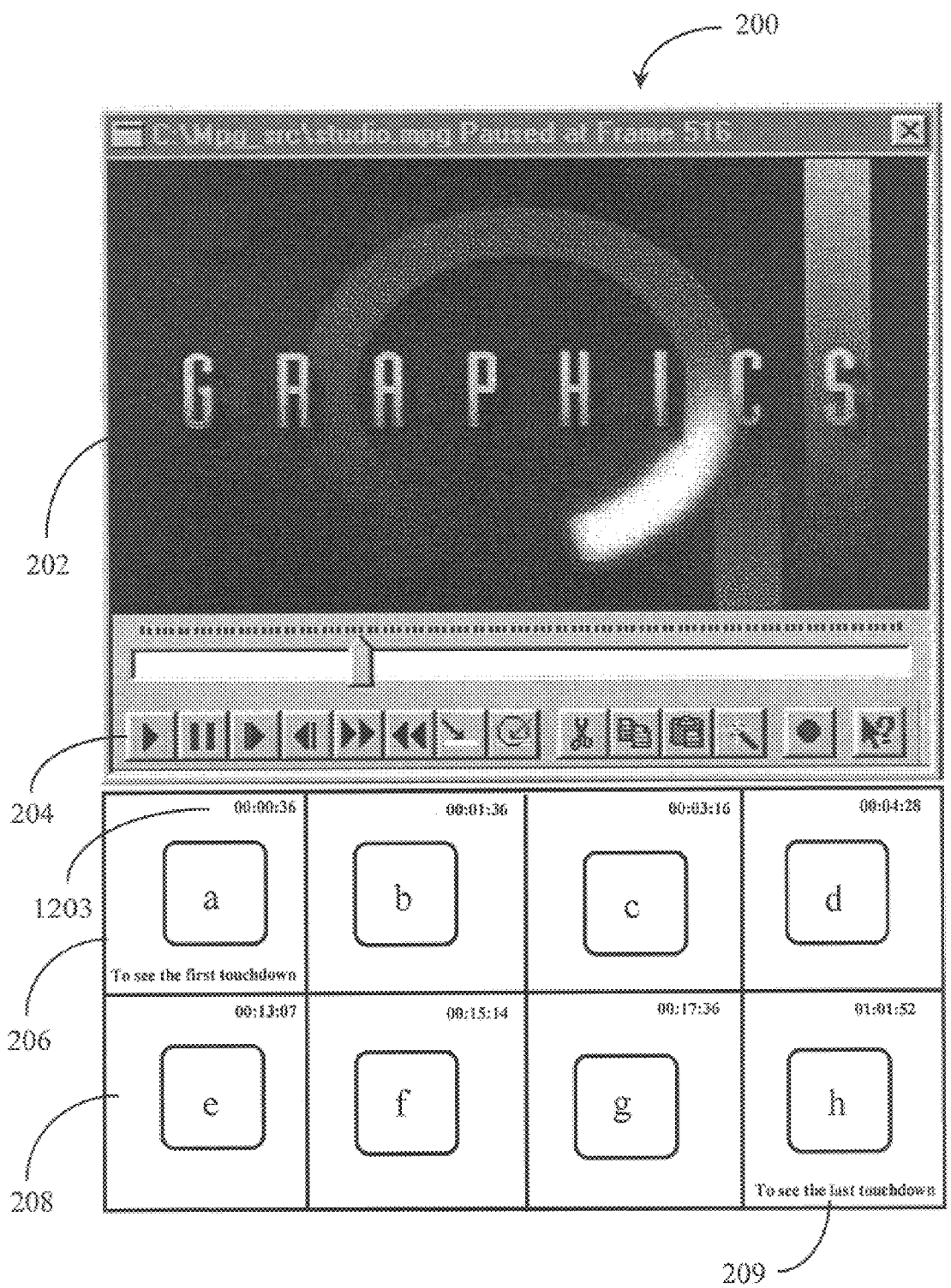

FIG. 15 is an illustration of an editing window 200 in a preferred embodiment of the present invention, illustrating additional functionality. Window 200 has the functionality described above for editing widow 187, and is further adapted to enable a user to manipulate entire video sequences by moving a single marker from one place in a sequence of markers into another. More detail regarding this innovative function is provided below.

Editing window 200 is adapted to work with stored digital files taken from a digital or analog video feed and, and is also adapted to simultaneously manipulate any associated annotation files that were rendered during authoring of the source feed wherein it was determined to send synchronous feeds to an end user via a separate network. Furthermore, window 200 is adapted to work on two or more separate video files wherein the final edited video contains sequences sourced from each separate file. However, in a preferred embodiment, window 200 is adapted to work with one video stream that is recorded and stored as a digital file.

Editing window 200 has a display window 202 for displaying a video stream during editing. Window 202 may also be used to view the entire video stream before, during, or after the editing process. A tool bar 204 displays various selectable functions adapted to control the video stream during the editing process, and also editing functions. For example, icons exemplifying various video-manipulation functions are presented in tool bar 204 and may be executed via selection and initiation by well-known pointer techniques, such as with a mouse device. The selectable functions are, in a preferred embodiment, the same as described above for editing window 185.

Editing window 200 in this embodiment has a first workspace 206 adapted for storing markers 206a–206d related to the video stream being edited. These markers are in a preferred embodiment are actually bitmap thumbnails. Thumbnails 206a–d are relatively low-resolution copies of an actual video frame. In this embodiment, thumbnails 206a–d are created by editor 185 to represent a first video frame or still of a sequence of frames that comprise a video-stream sequence. These markers are equivalent to thumbnails 196 in FIG. 14.

A software application known to the inventor and adapted to detect natural scene changes in a video stream is first used to identify and mark each beginning frame after a natural scene change. At each mark, a thumbnail such as thumbnails 206a–d is rendered and subsequently stored, and displayed in workspace area 206 as a sort of a book mark. In this way, all of the natural scene changes within the video data stream may be identified and made separable without the author having to review the video data. This process may be done at an accelerated video speed in order to save time. Once scene changes are marked as described above, the innovative software of the present invention provides the thumbnails and further capability regarding editing.

An exemplary order of presentation of thumbnails 206a–d as shown in workspace 206 is a serial order from the left to the right. It may be noted however, that other presentation orders or rules may be observed without departing from the spirit and scope of the present invention. Each thumbnail, such as thumbnail 206a is a first frame of all of the frames making up one video sequence beginning from a scene change (or from the first frame of the presentation, in the case of 206a). The inventors have noted that many notable highlights of a video begin with a scene change. It is to this logic that editor 185 implements scene change-detecting software. In actual practice, however, one video sequence beginning with a scene change and ending with a next scene change may contain more of or less of the particular subject of a desired highlight.

Thumbnails 206a–d are not limited in number, as it may be appreciated that one video may comprise numerous scene changes. Additional thumbnails stored in workspace 206 that are not immediately viewable may be rendered viewable by a scroll bar technique such as is known in the art. Pagination techniques may also be employed with workspace 206 to house additional thumbnails on one serial page.

An object of the present invention in the instant embodiment is to allow quick editing of live and pre-recorded video feeds by integrating computer capabilities with video-editing processes. Therefore, capability is provided that allows traditional computer-based techniques such as opening more than one instance of editor 185, and tiling and cascading of editing windows. Other provided computer capabilities include, but are not limited to, drag and drop, copy and paste, embedding and linking, image enhancement, and so on. Such capabilities, although not illustrated in this embodiment, but described above, may be assumed to be present. Such described capabilities may be available through drop down menus, additional tool bars, keyboard options, etc.

By viewing the created thumbnails 206a–d, and others, an author/editor may quickly identify portions of the overall event that may be desirable to be included in an edited version. The editor may, for example, wish to create highlights for a halftime show from recorded footage of the first and second quarters of a football game.

The editor may select a portion (clip) of the overall video represented by the thumbnails by selecting a thumbnail, then optionally view that portion (clip) in window 202 at either normal or accelerated rate, by use of the soft buttons in toolbar 204. During this optional viewing, other functions may be done, such as annotating, tracking of objects etc. The editor may then cut, paste, delete, and so on, to pare the portion represented by the original thumbnail to a desired length and content, which may then be replaced in window 206 represented by the same or another thumbnail or identifier. In one method the new clip may be placed back in region 206, and the position where placed would insert that clip in serial order with the other portions represented by scene changes.

In another preferred embodiment, after paring a portion of an original video presentation by editing, the editor may "drop" a portion of the video in window 208, representing a new edited video presentation, wherein edited clips may be placed and arranged after selection and editing. The user may save edited clips to window 206 to create a new video presentation. Such clips are represented in window 206 by thumbnails 206a–206h. Alternatively, the user can create an annotations-and-edit file, which could store just the "added" information, plus a file containing just the "clean video".

By repeating this process with other portions of the original video, the editor may create any desired reduced version having just the desired frames. In the second instance of the marker window, the editor may also further edit and re-arrange the newly created clips to finish and fine tune a new overall clip.

In an alternative embodiment new clips may be created by opening new instances of the editing interface 185 and dragging and dropping edited clips between instances. Also in an alternative embodiment voice annotation may be added to a new presentation.

Through further editing, frames may be deleted from a sequence and additional markers may be manually identified with a new thumbnail created thus dividing one sequence into multiple sequences. In a case such as this, each new sequence will begin with the created marker which appears as a new thumbnail in the workspace of the second editor.

In actual practice, thumbnails such as thumbnails 206a–d, are linked to the stored digital files that were created in the preliminary marking process to separate screen change sequences. As thumbnails are sorted and manipulated, stored files are thus sorted and manipulated accordingly, or alternatively, an editing file is created, which contains the new arrangement and can contain such things as annotation by itself or in a separate file. When played back on a window such as window 202 sequences appear in the newly manipulated order. Frame numbering may automatically be reassigned for the purpose of defining a new serial order of frames.

According to another embodiment of the present invention a more complex version of video editor 185 is provided and adapted to incorporate virtually all of previously described functions related to authoring such as image tracking, annotating, graphical overlay, signature processes and so on. This is accomplished via adding and integrating the various modules responsible for the added function and supplying the input command capability to execute those functions. In this embodiment, the editing (cut and paste) operations performed on the video stream precede creation of a synchronous annotation stream (wherein tracking and annotating is performed) with the operation of providing a signature mark being a last operation before broadcast. In a preferred embodiment, however, editor 185 is an off-line editor and may stand alone from the previously mentioned conventions.

It will be apparent to one with skill in the art that editors may take an appearance other than the ones illustrated herein without departing from the spirit and scope of the present invention. Various other tool bars, drop down menus, separate work spaces (within one editor), and so on, may be present as desired. It will also be apparent to one with skill in the art that editors may be adapted to function as stand-alone editors that may be employed away from an authoring station without departing from the spirit and scope of the present invention. For example, editor 185 may be employed in a news studio wherein an arriving video feed is recorded digitally and edited before re-broadcast.

It must also be noted here that in a case of sending separate streams (one video and one annotation) via separate media, the signature process as described with reference to the section entitled Method and Apparatus for Combining and Synchronizing Separately Sourced Video-Stream Data must be applied after such editing with editor 185 as may be done in a news room or some other location that may be geographically separate from an authoring station.

Editor 185 may be used to edit one video stream, a video stream and a synchronous annotation stream, more than one separate video stream such as creating one sequence with highlights from several separate videos, and so on. Because editor 185 enables a user to do much editing without repeated viewing, it saves time and money.

Scene Authoring

In another aspect of the invention scene authoring is accomplished to provide thumbnails in a video presentation in much the same manner as is done for editors 185 and 200 of FIGS. 14 and 15. In this aspect an automatic application finds scene changes as described above for the Editors, and thumbnails are provided comprising the first frame of each scene. An important difference is in the use of the thumbnails. In the editor applications described above the thumbnails may be selected and manipulated to manipulate the video clips they represent, allowing an editor to form new clips using all or portions of the individual video portions between scene changes. In the authoring aspect a video provided to an end user is provided with the main video displayed in a display window, as shown with window 187 in FIG. 14, and thumbnails, such as shown in FIG. 15 as a–h, are displayed proximate the video display window; in this case below the window.

Scene authoring comprises more than scene detection and presentation of thumbnails. In authoring, at the authoring station the author/editor may alter the strict division made by automatic scene detection, such as by deleting selected thumbnails and adding others, and by providing specific functionality for the thumbnails. For example, the author/editor may use editing functions as described above for combining video clips represented by thumbnails, by proscribing length of video between scene changes, and so on. The author may use any of the editing functions described, including text annotation and display of time stamps, overall frame numbers, and the like. Moreover, the thumbnails themselves may be edited in a number of ways, once they are produced and displayed. An author/editor, for example, may merge (group) two or more thumbnails, thereby merging the scenes the thumbnails represent. In this case the new clip will be represented by the thumbnail of one of the original clips. Grouped scenes may also be ungrouped into the constituent clips. One may also replace the thumbnail representing a clip or segment by a thumbnail derived from any other frame in the clip, or by a frame from another clip, or by any bitmap image desired. Functions are also provided for selecting a saving thumbnails as separate static bitmap files.

In FIG. 15 time stamps are represented by element number 1203. In addition to time stamps and frame numbers (not shown) the author/editor may also do text annotation as described above. The text annotation in this case will most often associate with function for a thumbnail. For example, text annotation represented by element reads: "to see the last touchdown". A user may select this thumbnails to run a video clip of the last touchdown. This "last touchdown" annotation is a bare example of many annotations that may be used. In a preferred embodiment the thumbnails are enabled in authoring as hot-spots, akin to URLs, such that an end user/viewer may "click on" a thumbnail, sending an interactive signal to the providing server, which responds by providing the represented video clip.

Personalized and Interactive Ad System/Network

According to yet another aspect of the present invention, a system is provided for enabling personalized video advertisements and data to be authored and delivered, either separately from or as part of a main video data stream to end users based on selected profile information originally provided by the end user. In a subscriber environment, the system and network provides a vehicle through which the present invention may be practiced.

Figure 16:
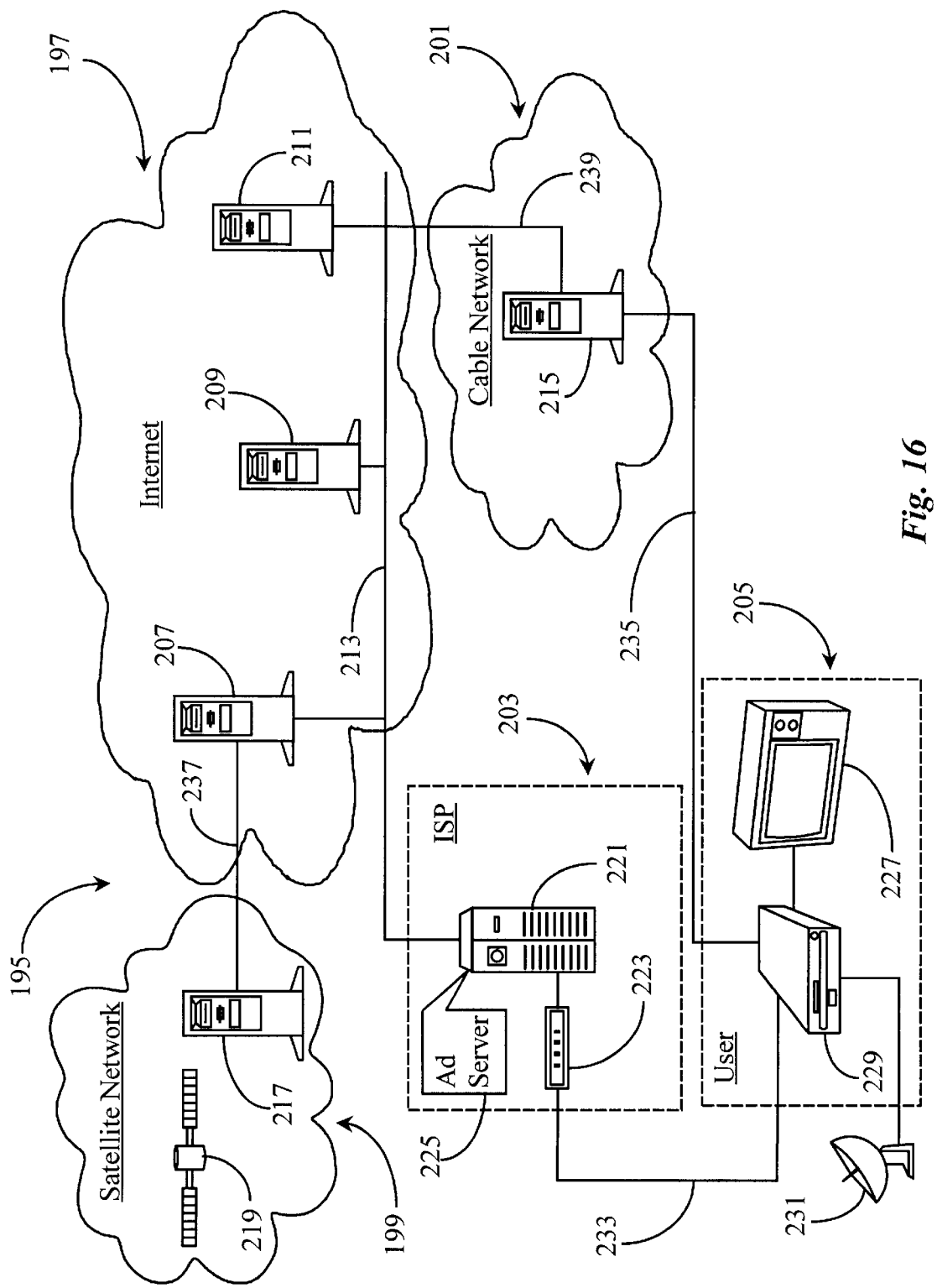
FIG. 16 is an overview of an exemplary ISP-based video delivery network supporting personalized and interactive video advertising according to an embodiment of the present invention.

FIG. 16 is an overview of a video delivery network (VDN) 195 wherein personalized video advertising and delivery is practiced according to various embodiments of the present invention. VDN 195 in this example comprises three traditionally separate networks represented herein as a satellite network 199, an Internet network 197, and a cable network 201. Satellite network 199 may be any user-subscribed satellite-based digital-television network such as are known in the art. A satellite relay system 219 is illustrated within network 199 and represents a means of signal transmission typical with such networks. Cable network 201 may be any cable-TV network such as are known in the art.

All three networks 197, 199, and 201 may be assumed to be networks through which content providers, defined for the purpose of this specification, as providers of video/audio content and delivery services, may deliver scheduled broadcast and on-demand video/audio programming to paying subscribers (end users). Various methods of delivery are possible with respect to content providers utilizing such networks.

VDN 195 also comprises, within the Internet domain, an Internet service provider (ISP) 203. An end-user premise 205 is coupled or connected to all three delivery systems in this example. User premise 205 has ability to receive video/audio programming from any one of networks 197, 199, and 201. A video display unit (VDU) 227 illustrated as part of user premise 205 is provided and adapted as a video/audio presentation system capable of playing content from any connected provider. VDU 227 may be a TV or a personal computer video display unit (PC/VDU) as are known in the art. In the system shown VDU 227 is a television.

A computerized video-capture and synchronization device 229, more commonly referred to as a set-top box, is provided and connected to VDU 227 for the purpose of capturing and synchronizing video and annotation streams from separate sources and preparing the content for suitable display on VDU 227. Set-top box 229 is analogous to video capture and synchronization device 115 of FIG. 12.

Set-top box 229 supports Internet (197) connectivity via an Internet access line 233 (typically a telephone line), which provides connection to ISP 203. Set-top box 229 in this example also supports cable-TV connectivity through access cable 235 to cable network 201. Box 229 further supports satellite-TV connectivity through a receiving dish 231 to satellite network 199. These connections are shown in their simplest form, and actual connections including additional equipment (not shown) are well known in the art for user connections with the three networks illustrated.

ISP 203 includes in this embodiment a unique ad server 221 which executes a software suite 225 for coordinating and serving interactive and personalized ads to a user at premise 205. Integration of ad server 221 with an ISP is exemplary and convenient, and not limiting to the invention, as the ad server to be described in more detail below may be a stand-alone server, or may be hosted by another enterprise, such as a cable supplier.

Ad server 221, as is described in more detail below, may contact other servers and pull pre-stored video ads that are focused to certain user profiles. Ad server 221 may also be served such ads via other connected servers that may be maintained by content providers and others. Ad server 221 is further capable of sorting video ads and inserting or including WEB page addresses (URL'S) into such video ads.

In a preferred embodiment of the present invention, satellite network 199 and cable network 201 each maintain Internet-capable servers. These are server 217 illustrated within network 199 and server 215 illustrated within network 201. Server 217 is illustrated as having connection to a WEB server 207 within Internet network 197 via line 237. Likewise, server 215 is illustrated as having connection to a WEB server 211 within Internet network 197 via line 239. In this way, content providers utilizing networks 199 and 201 may also provide content through Internet access. Such content may be uploaded to WEB servers 207 and 211 respectively. Access lines 237 and 239 are two-way communication links providing for download of Internet-based content as well.

Web servers 207 (satellite-network server) and 211 (cable-network server) are connected to an Internet backbone 213. Also connected to backbone 213 is a WEB server 209 which is provided and adapted to provide WEB-based content such as authored videos, interactive videos, and annotation streams such as taught above in other sections of this specification. An innovative aspect of the present invention is the inter-connectivity as illustrated between networks 199, 197, and 201 wherein ISP 203 may exploit such inter-connectivity for the purpose of providing profiled video advertisement from content providers operating in any of the three typically separate networks.

A content provider using satellite network 199 may broadcast a video to user 205 via satellite 219 and dish 231 to set-top box 229, and also may provide video advertisement (uploaded to WEB server 207 from server 217) for delivery through ISP 203 by way of ad server 221 over line 233 to set-top box 229. Similarly, a provider in network 201 may broadcast a video stream to user 205 via line 235 to set-top box 229, and also may provide video advertising uploaded to WEB server 211 from server 215 for delivery through ISP 203 via ad server 221 as described above. This interconnected and flexible system arrangement is provided and taught for reasons that will become more apparent in descriptions to follow.

According to a preferred embodiment of the present invention, ad server 221 provides all retrieval and coordination of ads with broadcast video and VOD streams. Via prior arrangement with an ISP such as ISP 203, content providers may store highly-profiled video advertisements at WEB servers such as servers 211 and 207, or at any connected repository accessible to ad server 221. Then, via push or pull techniques, such video advertising may be delivered in coordination with broadcast video or VOD streams through ISP 203 to user premise 205.

In an alternative embodiment of the invention a primary video data stream may be delivered by one network and advertisements by another, with integration still orchestrated by ad server 221. It was described above in the section entitled System for Synchronizing Data Streams Delivered Over Separate Networks, that annotated videos may be delivered with a main video stream delivered to a user via a cable network or such, while an annotation stream, associated with the main video, arrives via a separate network such as the Internet. VDN 195 provides for a very flexible system for delivering highly profiled video advertisements created by advertisers for a content provider that is delivering a normally scheduled broadcast of a main video to a user or users via a separate network such as via networks 199 or 201. In this case, the point where video data, annotated data, and video ads are combined and synchronized is at set-top box 229 which has added capability of combining data steams received from different carriers, and inserting video advertisements into scheduled or tagged time-slots created in the main video.

In one embodiment, content providers may sell advertising slots to companies that provide products or services. Such scheduled time-slots may be inserted at pre-determined intervals in a broadcast video. Such an insertion technique is termed donut insertion. Donut insertion involves a provider supplying one or more pre-scheduled blank video segments or created time slots to an offered presentation for the purpose of enabling advertisers to provide video ads to be inserted therein. In this case the provider of the data stream into which ads will be inserted, by prior arrangement with the enterprise hosting the ad server, will inform the ad server enterprise in advance of the number, position, and duration of the blank segments. Control over the number, duration, etc., can be at either end, also by prior arrangement.

In a preferred (and simplified) embodiment all video feed and ad control is by server 221, via the user's Internet connection. In this example the user is shown connected to server 221 by a telephone line through modem bank 223, but this is exemplary only. The user may be connected to server 221 by a satellite link, by a telephone line, or by any means known in the art for delivering digital feed.

In the case of all feed and control through server 221, there are a number of possibilities within the scope of the invention. Video presentations may be, for example, broadcast or video-on-demand. If broadcast, the provider of the main video would provide blank intervals in the video stream in which ads may be inserted, and the number of ads and ad selection for each of the known blank intervals will be at the discretion of the enterprise hosting the ad server. The ads may be authored and stored at any convenient repository, and the ad server will recall the ads at the appropriate times and insert them in the appropriate slots.

The exact nature of the ads (degree of personalization) inserted by the ad server depends on the nature of the service. In some cases the choice of ads will be by the server, and based upon stored profiles of users logging in. In other cases, the choices will be based on preferences made by users interactively via the Internet back-channel. In practicing the invention advertisers may prepare a variety of video ads targeting various user profiles, and the ad server will use stored profiles and user interactivity to select the appropriate ads to be inserted.

In the case of video-on demand (VOD) wherein a user orders a particular stored video presentation to be sent at a particular time, ads may be selected and inserted at any convenient time prior to sending to the user. Ads in this case may reach the maximum personalization because the video is unicast to just the selected client, and ads can be focused completely personally to the client.

There are a number of ways that the logistics may be handled in the case of VOD for ad authoring and serving. Ads can be authored in advance for individual subscribers, and personalized based on a user profile provided by the subscriber on subscription and periodically updated. Personalization will, in most cases, be based on such parameters as age group, sex, income groups and area. In a typical operation, ads will be prepared in advance, for example, for males, between 20 and 40, in professional occupations, over a threshold income, and living in urban areas. The hosting enterprise will sell time slots to advertisers in any convenient and reasonable combination, and the ads prepared can be stored at a data repository convenient to the ad server, or on a server elsewhere in the network.

When a subscriber orders a video presentation, the ad server notes the client ID, matches the ID with the user profile, consults a dynamic ad schedule (periodically updated), and determines the ads to be inserted. In this example the ad server controls, and pulls both the video presentation and the ads to be inserted from data storage or from other servers connected to the network (Internet), controlling the data streams at the ad server to start and stop each video stream at the appropriate times to place the ads, and so forth.

In an alternative embodiment the ad server does not insert ads into a video stream and send the result on to the client, but instead stores URLs (Internet addresses) for ads. When a subscriber orders a presentation the user profile is accessed based on the user ID, and the ad engine pulls the selected video stream from whatever server on the Internet provides that stream. The ad engine retrieves the needed URLs for ads to be inserted, and inserts the URLs in the video stream as metadata by the techniques disclosed herein for such insertion.

In this embodiment the playback unit at the clients station (205) makes use of the inserted metadata to pull the relevant ad or ads from the appropriate destinations in the Internet. In many cases such ads may be provided with an annotation stream as well, so the ads themselves are interactive, and the user/client may interact with the ad or ads to accomplish a range of functions, such as displaying an advertisers page on the Internet, and accessing further product or service information, place orders and the like.

In a broadcast situation, as opposed to VOD, the logistics may differ in several respects. In this situation there are a number of options that the ad server may employ. In all cases, however, the ad server maintains control. Typically the ad server will follow a predetermined broadcast schedule, and store and organize URLs for the Internet-connected servers having the pertinent main video stream, ad streams, and annotation streams. The ad server, being the controlling entity, triggers other sources to broadcast as required by the schedule. For example, the ad server, via URL according to the broadcast schedule, triggers a video server to begin broadcasting a main video. At the same time the ad server maintains a compound profile of clients logged on to the server and to whom the broadcast is directed. Based on the profile and ad time sold, the ad server predetermines ads to be included in the broadcast.

According to the determined ad schedule, at appropriate times during the broadcast, the ad server triggers the video server to stop the main video stream, and triggers the same or a different server to begin broadcasting the appropriate ad stream. If there is an annotation stream associated with the ad stream that has to be triggered and broadcast as well. When the ad is finished the ad streams are stopped and the main video is triggered to begin again at the point it was stopped. The process continues according to the ad schedule. Again, ads may be selected and triggered according to profiles of users logged on. Also, in some embodiments, multiple ads may be streamed, and a profile set at the client may select ads from the ads streamed. Metadata may be inserted as well for full interactivity at the user station.

The embodiments of the invention relative to authoring and serving ads thus far described, are described within the framework of interactive television wherein the ad server, the video streams, the ads, and any annotation streams are all pushed or pulled from Internet-connected sources, and all sent to the user/client by Internet delivery. There are, however, many embodiments of the invention wherein video streams may be controlled and ads authored and server within the scope of the invention involving other networks than the Internet alone. FIG. 16 is meant to reflect this diversity and flexibility, by showing interconnected networks, including satellite network 199 and cable network 201. set-top box 229 is connected to all three networks and may receive digital data streams by any of the networks unilaterally or in combination. Note that all networks are interconnected through Internet connection. This allows control of content streaming from Internet-connected ad server 221.

Now, as an example, when a client at premise 205 decides to purchase a scheduled program (VOD) from a cable company, his profile may be communicated, by prior arrangement, to the cable company by ad server 221. Based on the provided profile, video ads may be selectively pulled or pushed from Internet-connected servers such as server 211 according to "best match to profile". Control remains with ad server 221, which may process its own ad schedule and perform many of the functions described above for the "Internet-only" embodiments. The same functionality may be provided through satellite network 199, and Interactive ads may be authored and served in several ways in cooperation with satellite based video providers. By the network interconnectivity shown, utilizing digital broadcast techniques, ads and annotation streams may be accessed and coordinated from virtually any source within the scope of the present invention.

In a preferred embodiment of the present invention, an ISP such as ISP 203 will be the dominant partner in a service arrangement with various content providers using various delivery networks. This will insure that user information such as may be included with a user's profile may be kept secure as his ISP will most likely retain his subscription over content providers. Content providers may be added or subtracted from a user's capability based on user discretion. For example, user 205 may desire video services from cable network 201, but not satellite network 199, and so on.

In another embodiment of the present invention, wherein broadcasting of live events is practiced, each content provider may create interactive advertising via previously taught methods and additionally provide donut insertion intervals that may be filled by local ISP sponsored video ads.

Pre-authoring of either pre-stored or live broadcast videos may be performed at WEB-based facilities or content provider-based facilities. For example, a live football game may be broadcast from an onsite location wherein authoring is performed via an Internet-based authoring station before re-casting over various delivery networks.

A VDN network such as VDN 195 facilitates a flow of content in virtually any pre-conceived or planned direction. Such capability has not been offered or achieved in prior art. As previously described, a user may choose from which network to receive VOD content as long as such networks maintain a channel over which such content may be streamed and a working arrangement with the enterprise hosting the ad server. In this way, a user such as user 205 may add a wide variety of content providers to his service.

With regard to regularly scheduled broadcast channels such as are currently provided via cable companies and the like, advertisers already owning non-interactive or non-hyperlinked commercial slots may be solicited through consultation to restructure their advertisements based on statistics regarding supplied user profiles if there are enough equipped viewers to comprise a suitable advertising base wherein all individual profiles are known. Such combined profiles may be created for each program by comparing individual known profiles from a total number of viewers likely to be accessing programs via CPE of the present invention. Additionally such advertisers may be offered an opportunity to add certain interactive content such as URL's or the like to their video ads. In this case, ad server 221 may pull appropriate new adds based on the most updated statistical report showing current user-combined profile statistics. Under such an arrangement, ads created by different advertisers may be rotated in among different shows with profile matches retaining seniority. Charges to advertisers may be based on a percentage of actual air time wherein the pricing for ads that better match a combined viewer profile, and thus are most often rotated in over the course of a broadcast day, is set according to actual air time after the fact.

Figure 17:
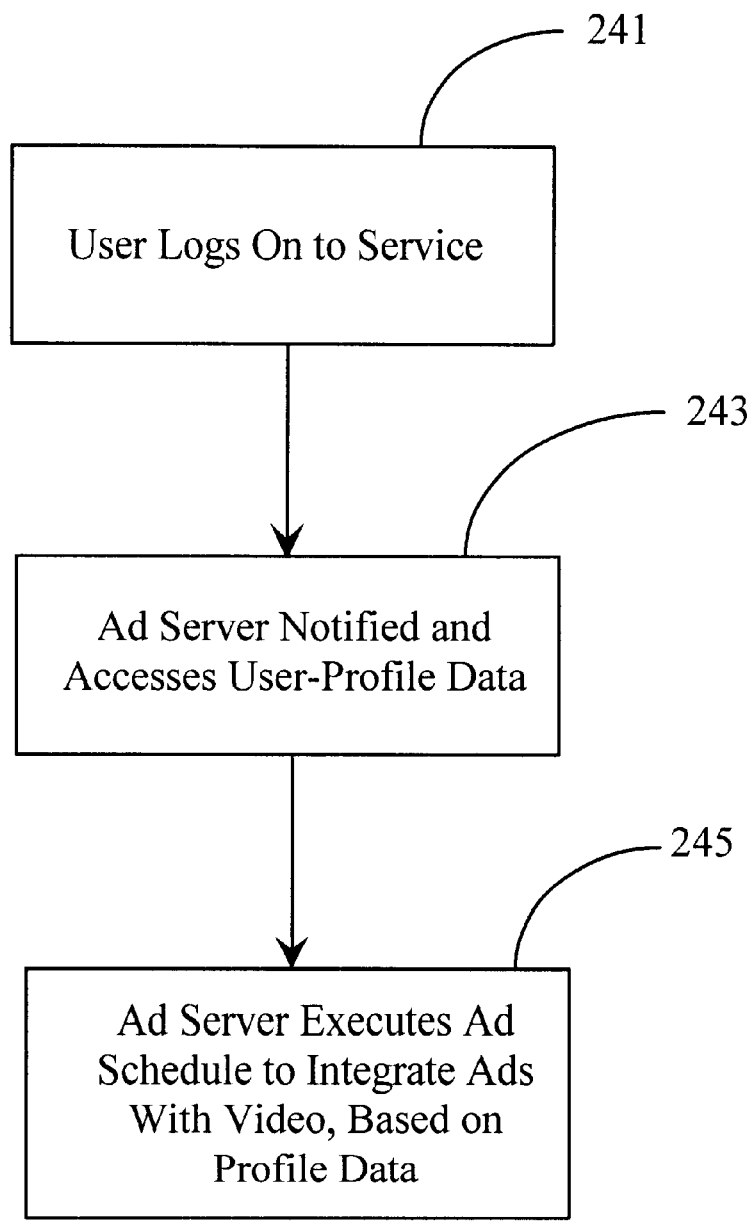
FIG. 17 is a process flow chart illustrating video-ad server function and interaction according to an embodiment of the present invention.

In all aspects of the present invention, a controlling entity, such as the ad server described above, manages ad placement in video data streams, and, in preferred embodiments information from subscribers is used in selecting of ads to be included. FIG. 17 is a brief flow chart of steps in the process of the present invention. At step 241 a subscriber logs on to a service associated with an ad server enterprise. In various embodiments the user may log on to an ad management server, an ISP integrated with an ad management server, or to another service, such as a satellite or cable provider having an arrangement with the enterprise hosting an ad management server. At step 243 the ad server, being directly or indirectly notified, accesses stored user-profile data based on the user ID. At step 245 the ad server, executing its own control routines, accesses ads and optionally annotation streams, and controls integration of the ads and annotation streams with primary video stream, to accomplish personalization and interactivity according to embodiments of the invention, as described above. As also described above, the integration and interactivity of ads may be accomplished in a number of different ways.

The above steps are intended to be exemplary of a wide variety of sequences which may occur under different circumstances. For example, content providers may have direct connection to ad servers instead of hosting additional network servers. There may be differences in process according to which network provides content, whether or not there are additional annotated streams that must be delivered, and so on. In a flexible VDN such as the one taught herein, there are many varying possibilities.

In preferred embodiments of the present invention the user premise 205 includes a set-top box or other computerized device capable of executing code. In many embodiments unique code is provided as a part of the service for adding functionality to the set-top box or other device used to receive and display video. Such added code comprises code, for example, to select among multiple ads that may be served to the device, based upon user-defined profile data. The user may, for example, enter a profile including sex and age. Then in receiving and preparing for display of data streams provided, the set-top box or other device will select to display those ads targeted to the profile, and not other ads that may be sent simultaneously. This facility can act as a selective filter in this respect.

Device 229 in various embodiments is also capable in many embodiments of synchronizing data streams received by distinct delivery paths, as described above in the section entitled: "System for Synchronizing Data Streams Delivered over Separate Networks. Main video streams, annotation streams, ad streams, and the like may therefore be delivered by separate and distinct delivery paths (different networks), and any latency may be ironed out at the user's device.

It will be apparent to one with skill in the art that a data capture and synchronization device such as device 229 may have yet additional features without departing from the spirit and scope of the present invention such as an input port for a personal computer for the purpose of inputting profile information to the unit. Moreover, multiple profiles may be kept on additional household members having different passwords and profile keys such that advertising may, in some embodiments, be specific to certain household members who purchase videos and otherwise interact with the service in embodiments of the invention.

Multiplexing Video Metadata and Use of Presentation Time Stamp

According to yet another aspect of the present invention, a method is provided for multiplexing separately-authored video metadata using a presentation time stamp (PTS) convention as a commonality in metadata packaging. A digital PTS is an integral part of substantially all digital video formats, and when dealing in digital video streams for purposes of this invention the digital PTS may be used. In the case of analog streams a PTS may be generated by any of several methods and integrated with the analog data stream for use in synchronizing annotation data with the analog stream. In the descriptions below the term PTS is meant in the more general sense covering both digital and analog streams. Methods and apparatus for accomplishing the purposes of the invention are described in enabling detail below.

Figure 18:
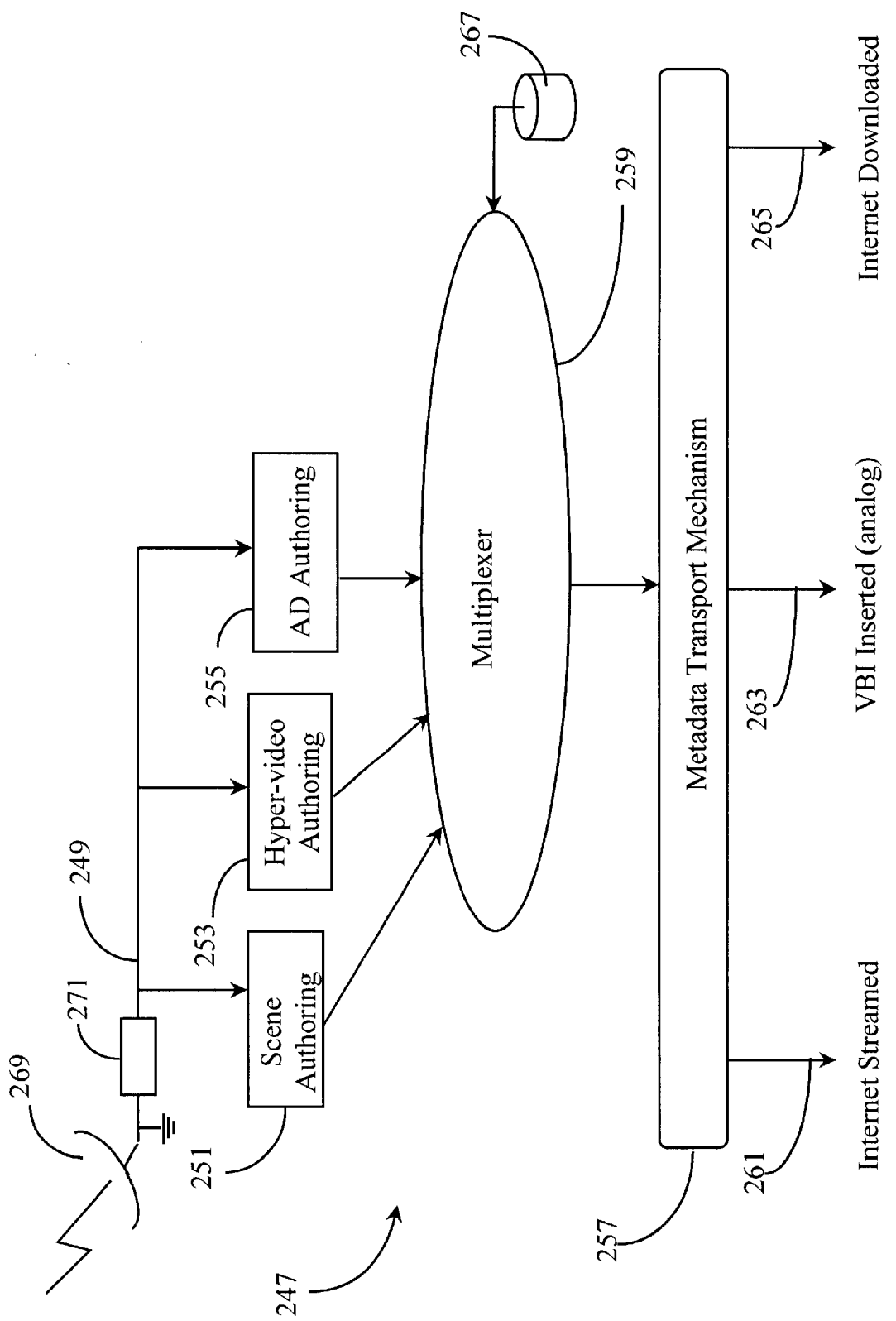
FIG. 18 is a diagram of a multiplexing system according to an embodiment of the present invention.

FIG. 18 is a block diagram illustrating a metadata authoring, multiplexing, and delivery system 247 according to a simplified preferred embodiment of the present invention. In practice the overall system may be considerably more diverse than shown in FIG. 18, but the simplified diagram of FIG. 18 serves to illustrate principles of the invention. System 247 illustrates three distinctly separate authoring functions in this example, each of which may comprise one or more authors and authoring stations. The fact of three authoring functions is exemplary, as there may be more than three, and of other sorts than those shown here.

The three authoring functions shown are a scene-change authoring function 251, a hyper-video authoring function 253, and an ad-authoring function 255. System 247 further encompasses a multiplexer function 259 for data merging, and a metadata transport mechanism 257 which allows various transport options for end-user delivery. Multiplexer 259 in many embodiments of the invention exists as a server with the unique multiplexing software described herein, ports for receiving data streams, both primary and annotation streams (metadata), and ports for serving the multiplexed result to either other stations in a network or directly to end users.

The delivery options include, but are not limited to, option 261 (Internet Streamed), option 263 (VBI Inserted), and option 265 (Internet Downloaded). In this aspect it is assumed that all data is delivered by a common carrier, in this example the well-known Internet network.

Multiplexed streams may be streamed over the Internet in various embodiments either multicast or WEBcast. In multicast the server streams the video, including metadata onto the Internet. In WEBcast the multiplexed data is streamed to subscribers logged onto the server. In the case of VBI inserted metadata, the stream is analog and the metadata is inserted in the video blanking intervals of the main video data stream. In this case the metadata will typically be compressed, because of the limited bandwidth aspect of VBI techniques. In the case of downloading over the Internet data streams are stored at a WEB server, and the end user selects and downloads the video.

There are a number of options in delivery. Metadata may be inserted into digital video, for example, in a manner that equipment at the end user's station may access the metadata and display the enhancement provided by the metadata along with the primary video presentation. As has been described previously, there may be more data than an end user will use, and user characteristics may operate to select particular data, such as particular advertisements based on the end user's profile. Also, the metadata may be streamed separately from the primary video and coordinated at the user's end according to time placement information in the video streams. This coordination is at the heart of the present invention. In the case of multiplexed data streams stored for selective downloading by users, the stored stream may be a combined stream or one or more marked separate streams.

It is known to the inventors that digital video presentations typically contain a presentation time stamp (PTS) signature. This convention numbers each video frame of the video stream with a serial number. For example, the first video frame in a video is typically numbered 0 and the second frame 1, and so on. The inventors in several embodiments use this convention as a commonality for merging and coordinating metadata via a multiplexer such as multiplexer 259. Therefore when using the digital PTS for synchronization, analog video streams are converted to digital form before they are subjected to processing under system 247. In other cases a PT may be generated for an analog video stream, inserted in such as the VBI of the analog stream, and used for synchronization, in which case it is not necessary that the analog stream be converted to digital.

In a preferred embodiment, authored and merged metadata is transported across an Internet link to an end user having suitable CPE equipment adapted to decode and apply metadata so that an end user may interact with a main video through manipulation of displayed annotation as previously taught in this specification. This example is consistent with a subscriber situation wherein a user will order an annotated video from an Internet-based video server termed HoTV by the Inventors. However, delivery of a main video by other means while obtaining metadata from the Internet is also possible as has been taught above.

Referring again to FIG. 18, a video stream 249 (main video) is provided, in this case from a satellite feed 269. This main stream can be from a stored source, another system like system 247, or may be a live feed. In some cases a timing coordination function 271 is provided to ensure that the main feed is coordinated in time with authoring stations and the multiplexer server. This function can take a number of forms, such as noting absolute time variation between stations and buffering the video feed accordingly. The video feed is provided to each authoring function 251, 253, and 255 as illustrated in this example. Authors at each station accomplish annotation during viewing of video 249. For example, scene authoring uses known SCDT techniques to mark scene changes for several purposes as described in the background section. Among these are marking for ad insertion and providing thumbnail markers as a selectable feature to an end user for allowing such as video review by portion. In this process the author may also merge scenes and edit markers. Hyper-video authoring function 253 provides object tracking coordinates, interactive regions based on such coordinates, creation of hot spots (hyper-links), and so on. Ad authoring function 255 provides metadata about ads such as which ads to pull and where they belong in the main video.

In addition to live authoring, there may be input to multiplexer 259 from one or more stored sources as represented by repository 267. This source may provide interactive ads previously prepared, and other sorts of metadata as well to become part of the ultimate feed to end users.

The present invention is not limited to the above example, as stream 249 may also be authored in serial order such as via station 251, then station 253 followed by station 255, rather than in parallel. Moreover, stream 249 may be a live stream or authoring may be performed on a pre-recorded stream. Authoring may be performed off-line or on-line. There may be more than one author at each represented function such as functions 251, 253, and 255 simultaneously working on one video stream such as stream 249. There are many possible variations in both distribution of authors, assignment of authors, order of authoring, and so on. It should be clear as well that the entire process may be cascaded in a multitude of different ways. That is, an original process may provide, via a multiplexer server a data stream including a main video presentation and original metadata for any of the functions described, such as HoTV, ad insertion and the like. This result can go to another system where further authoring and multiplexing is done, and may be cascaded to any number of such processes, although in practice the cascading will be relatively limited to remain manageable.

In a preferred embodiment, authors working in function groups 251–253 tag created metadata with an appropriate frame number or numbers (PTS) which will indicate a frame or series of frames where resulting annotation will appear during playback of the video. This is automatic in most instances, but can also be performed manually. After authoring and tagging, the metadata progresses to multiplexing.

It is the purpose of multiplexer 259 to package all metadata for transport to an end user. Firstly, metadata is sorted and associated by PTS tag. For example, metadata from each of stations 251–253 is assembled or packaged according to a same PTS indicator or signature. Rules governing what type and how much metadata will be inserted into any one or a series of frames of a video are, of course, set-up before authoring.

After the metadata is packaged, multiplexer 259 may compress or encode the metadata according to any specific transport means. For example, if delivery will be over a high bandwidth, metadata may, optionally, not be compressed. Most often, however, bandwidth will be less than guaranteed, therefore compression of metadata will usually be performed by default. One or more known encoding techniques may be made available for differing scenarios.

Transport mechanism 257, as previously described, provides optional delivery methods illustrated via downward facing arrows 261, 263, and 265. Option 261, Internet streaming, may be performed with metadata being streamed independently while a main video arrives separately, or, a single muxed stream may be provided comprising the main video and the metadata. In option 261 the delivery of the annotation stream may be either multicast or WEBcast. In the VBI case the metadata is typically compressed and inserted and the stream is broadcast. In another case, metadata could be downloaded independently over the Internet via option 265 and be disseminated and rendered when a user plays a previously downloaded video or a pre-recorded VOD presentation served from an Internet server. In still another case, metadata may be muxed in with a main video and then be made available for download via option 265. An analog video may be served with the metadata inserted in VBI as illustrated via option 263. Because of the wide range of architecture that may be supported in such a system, combining main and authored data at many points, it is necessary to do more than simply copy PTS from a main video stream and use it in placing metadata. Several synchronization techniques are also used. For example, at a point in such an architecture where two streams are brought together from different sources, in various embodiments of the invention the system may compare real time clocks of sources and buffer one or both streams from the separate sources to compensate for time differences. Another technique used in some embodiments is to rewrite the presentation time stamps of one stream based on the real time PTS of the other and the difference in time of the two streams. In all cases, video streams are preferably provided to separate authoring stations from a single source to avoid timing problems as much as possible.

A suitable de-multiplexing module (not shown) is provided and supported at the end user's location. Such an adaptation could be incorporated easily in a video capture and synchronization device such as device 115 of FIG. 12 which already supports annotation and main video stream buffering and synchronization as well as having dual capability of rendering analog or digital streams to an appropriate VDU. A de-multiplexing module decompresses, reads and buffers the metadata, makes use of PTS for synchronization purposes in the event that the metadata is not already muxed in to the main video, and renders the metadata for display on a suitable VDU over or alongside a main video.

It will be apparent to one with skill in the art of video authoring and broadcasting that the present invention may be practiced with live video or pre-recorded videos without departing from the spirit and scope of the present invention. In the case of pre-recorded video, metadata is preferably sent to an end user slightly ahead of a main video to insure that all metadata is properly processed and rendered in time for presentation streaming.

If metadata associated with a pre-recorded video is to be streamed separately, metadata is preferably sent ahead of a main video and is buffered at the user's end, therefore, video delay is not required. If a video is authored live and streamed separately from the metadata, then the main video is buffered. This may cause a very slight delay in the video frame rate. Muxing a live metadata stream into a live video stream before delivery will ease buffering requirements that may be observed with separate streams.

It should also be apparent to one with skill in the art that the present invention is not limited to the domain of the Internet. For example, authoring may be performed in coordination with a broadcasting entity having suitable digital capability and connection to the Internet wherein authored metadata may be diverted to an end user via Internet connection such as via an ISP while main video content is delivered via normal cable path or perhaps via satellite. There are many possibilities.

It should further be apparent to one with skill in the art that the methods and apparatus of the present invention may be practiced in a variety of ways, and the elements may be implemented in a variety of hardware and software within the scope of the invention. Therefore, the present invention should be afforded the broadest scope and not be limited to the exemplary embodiments as taught herein. The present invention is limited only by the claims that follow.

What is claimed is:

1. An authoring system for interactive video, comprising:
   video feeds providing video streams;
   two or more authoring stations coupled to the video feeds providing authoring functions creating intermittent metadata for enhancing the video streams; and
   a multiplexer for coordinating authored metadata with the video streams;
   wherein, in the creation of metadata, the authoring stations note a presentation time stamp (PTS) of video frames or a synchronized system time from the video streams at the point in the video streams the authored metadata is to be later inserted, and incorporate the PTS in the authored metadata for matching the authored metadata with the video streams, and wherein time clocks are monitored for separate stream sources and clocks are adjusted to compensate for real-time differences in sources.

2. The system of claim 1 wherein one or more of the stream sources is from a stored source.

3. The system of claim 1 wherein PTS values are rewritten in one or more video streams to compensate for perceived time differences.

4. The system of claim 1 wherein the PTS-enhanced metadata is streamed over the Internet to an end user.

5. The system of claim 1 wherein the PTS-enhanced metadata is inserted into video blanking intervals (VBI) of an analog stream according to the PTS.

6. The system of claim 1 wherein the PTS-enhanced metadata is stored to be downloaded as needed by a user.

7. The system of claim 1 wherein the authoring stations include one or more of scene authoring, hyper-video authoring, and ad authoring stations.

8. The system of claim 1 wherein the video streams are analog streams, and the analog streams are converted to a digital format before authoring and multiplexing.

9. The system of claim 1 wherein the video streams are analog streams, and a presentation time stamp is generated and integrated with analog steams.

10. The system of claim 1 further comprising a user system enhanced with software for rendering the video streams and the authored metadata according to the PTS.

11. A method for coordinating authored video metadata with video data streams, comprising steps of:
    (a) ensuring the video data streams have presentation time stamps (PTS);
    (b) feeding the video data streams to authoring stations;
    (c) authoring intermittent metadata at the authoring stations to be later used to enhance the video data streams;
    (d) marking the metadata with presentation time stamps (PTS) taken from the video data streams at the time of authoring the metadata; and
    (e) multiplexing the authored metadata with the video data streams, wherein the multiplexer places the metadata in relation to video data streams according to the PTS, and multiple sources of video is fed to the multiplexer as well as metadata, and the multiplexer compensates for real-time differences between the multiple sources.

12. The method of claim 11 wherein, in the compensating step, presentation time stamps (PTS) are amended according to source time differences.

13. The method of claim 11 wherein the PTS-enhanced metadata is streamed over the Internet to an end user.

14. The method of claim 11 wherein the PTS-enhanced metadata is inserted into video blanking intervals (VBI) of an analog stream according to the PTS.

15. The method of claim 11 wherein the PTS-enhanced metadata is stored to be downloaded as needed by a user.

16. The method of claim 11 wherein the authoring stations include one or more of scene authoring, hyper-video authoring, and ad authoring stations.

17. The method of claim 11 wherein the video data streams are analog steams, and the analog streams are converted to a digital format before authoring and multiplexing.

18. The method of claim 14 further comprising a step for displaying the video data streams and authored metadata according to PTS at a user's station.

19. A video multiplexing system comprising:
    inputs for digital video data streams; and
    inputs from video authoring stations, comprising intermittent metadata associated with the video data streams by presentation time stamps (PTS) copied from the video data streams at the time of authoring; and
    an output to a video transport interface;
    wherein one or more of the inputs for digital video data streams are from stored sources, and the multiplexing system notes the presentation time stamps associated with the authored metadata, monitors real time clocks of the sources and uses the information to compensate one or both of the multiple streams, and places the authored metadata relative to the video data streams for transport to end users.

20. The multiplexing system of claim 19 wherein the multiplexer compensates incoming streams by buffering one or more of the streams.

21. The system of claim 19 wherein the multiplexer compensates incoming streams by amending the presentation time stamps of one or more of the digital video data streams.

* * * * *